United States Patent
Yoo et al.

(10) Patent No.: US 12,231,822 B2
(45) Date of Patent: Feb. 18, 2025

(54) ELECTRONIC DEVICE FOR PROVIDING VISUALIZED ARTIFICIAL INTELLIGENCE SERVICE ON BASIS OF INFORMATION ABOUT EXTERNAL OBJECT, AND OPERATING METHOD FOR ELECTRONIC DEVICE

(71) Applicant: SAMSUNG ELECTRONICS CO., LTD., Suwon-si (KR)

(72) Inventors: Yunson Yoo, Suwon-si (KR); Kihwan Kim, Suwon-si (KR); Younjung Kim, Suwon-si (KR); Junyoung Kim, Suwon-si (KR); Sanghee Park, Suwon-si (KR); Minyoung Lee, Suwon-si (KR); Jinhak Lee, Suwon-si (KR); Ilkwang Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 616 days.

(21) Appl. No.: 17/428,518

(22) PCT Filed: Oct. 29, 2019

(86) PCT No.: PCT/KR2019/014326
§ 371 (c)(1),
(2) Date: Aug. 4, 2021

(87) PCT Pub. No.: WO2020/171342
PCT Pub. Date: Aug. 27, 2020

(65) Prior Publication Data
US 2022/0132081 A1    Apr. 28, 2022

(30) Foreign Application Priority Data
Feb. 21, 2019  (KR) .................. 10-2019-0020233

(51) Int. Cl.
*G06T 7/70* (2017.01)
*G06F 3/01* (2006.01)
(Continued)

(52) U.S. Cl.
CPC .......... *H04N 9/3141* (2013.01); *G06F 3/011* (2013.01); *G06F 3/0304* (2013.01); *G06T 7/20* (2013.01);
(Continued)

(58) Field of Classification Search
CPC .... H04N 9/3141; H04N 9/3179; H04N 23/80; H04N 23/695; G06T 7/70; G06T 7/20;
(Continued)

(56) References Cited

U.S. PATENT DOCUMENTS 9,374,554 B1 *  6/2016  Poulad .................. H04N 7/142
10,594,993 B2 *  3/2020  Kim ..................... H04N 9/3147
(Continued)

FOREIGN PATENT DOCUMENTS

KR   10-2016-0102411   8/2016
KR   10-2017-0062533   6/2017
(Continued)

OTHER PUBLICATIONS

Office Action dated Aug. 25, 2023 in Korean Application No. 10-2019-0020233 and English-language translation.
(Continued)

*Primary Examiner* — Sean T Motsinger
(74) *Attorney, Agent, or Firm* — Nixon & Vanderhye, P.C.

(57) ABSTRACT

With respect to an electronic device and an operating method for the electronic device, according to various embodiments, the electronic device comprises: a rotatable vision sensor configured to detect an external object in a space in which the electronic device is arranged; a rotatable
(Continued)

projector configured to output a picture in the space in which the electronic device is arranged; a memory storing spatial information about the space in which the electronic device is arranged; and a processor, wherein the processor can be configured to: control the vision sensor so that the vision sensor tracks the external object while rotating, determine the position of the picture to be output by the projector based on the spatial information and external object information generated based on the tracking of the external object, and control the projector to output the picture at the determined position.

15 Claims, 24 Drawing Sheets

(51) Int. Cl.
| | | |
|---|---|---|
| *G06F 3/03* | (2006.01) | |
| *G06T 7/20* | (2017.01) | |
| *H04N 9/31* | (2006.01) | |
| *H04N 23/695* | (2023.01) | |
| *H04N 23/80* | (2023.01) | |
| *H04R 1/32* | (2006.01) | |
| *G06F 1/16* | (2006.01) | |

(52) U.S. Cl.
CPC ............. *G06T 7/70* (2017.01); *H04N 9/3179* (2013.01); *H04N 23/695* (2023.01); *H04N 23/80* (2023.01); *H04R 1/326* (2013.01); *G06F 1/1639* (2013.01)

(58) Field of Classification Search
CPC ...... G06F 3/011; G06F 3/0304; G06F 1/1639; H04R 1/326
See application file for complete search history.

(56) References Cited

U.S. PATENT DOCUMENTS

| 11,544,895 | B2* | 1/2023 | Bruns ................... G06T 15/04 |
| 2012/0086924 | A1 | 4/2012 | Moon et al. |
| 2012/0275686 | A1 | 11/2012 | Wilson et al. |
| 2016/0098862 | A1* | 4/2016 | Wilson ................. H04N 9/3147 |
| | | | 345/419 |
| 2016/0109955 | A1* | 4/2016 | Park ........................ G06F 3/011 |
| | | | 345/668 |
| 2016/0295185 | A1* | 10/2016 | Mima .................. H04N 9/3185 |
| 2016/0335475 | A1 | 11/2016 | Krenzer et al. |
| 2017/0039030 | A1* | 2/2017 | Ikeda ................... H04N 9/3179 |
| 2017/0243578 | A1* | 8/2017 | Son ..................... G10L 21/0208 |
| 2018/0045963 | A1 | 2/2018 | Hoover et al. |
| 2018/0063587 | A1* | 3/2018 | Cerda ................ H04N 21/4532 |
| 2018/0357504 | A1* | 12/2018 | Zamir ..................... G06V 10/50 |
| 2019/0007690 | A1* | 1/2019 | Varadarajan ........... G06V 20/46 |
| 2019/0118091 | A1* | 4/2019 | Taylor ..................... A63F 13/25 |
| 2020/0174556 | A1* | 6/2020 | Kim ........................ G06F 3/017 |
| 2022/0094889 | A1* | 3/2022 | Lee ....................... H04N 9/3194 |
| 2022/0132081 | A1* | 4/2022 | Yoo ........................ H04R 1/406 |

FOREIGN PATENT DOCUMENTS

| KR | 10-1931788 | 12/2018 |
| WO | 2012/149501 | 11/2012 |
| WO | 2015/098188 | 7/2015 |
| WO | 2015/117905 | 8/2015 |
| WO | 2018/031621 | 2/2018 |

OTHER PUBLICATIONS

International Search Report for PCT/KR2019/014326 mailed Feb. 5, 2020, 4 pages.
Written Opinion of the ISA for PCT/KR2019/014326 mailed Feb. 5, 2020, 4 pages.

* cited by examiner

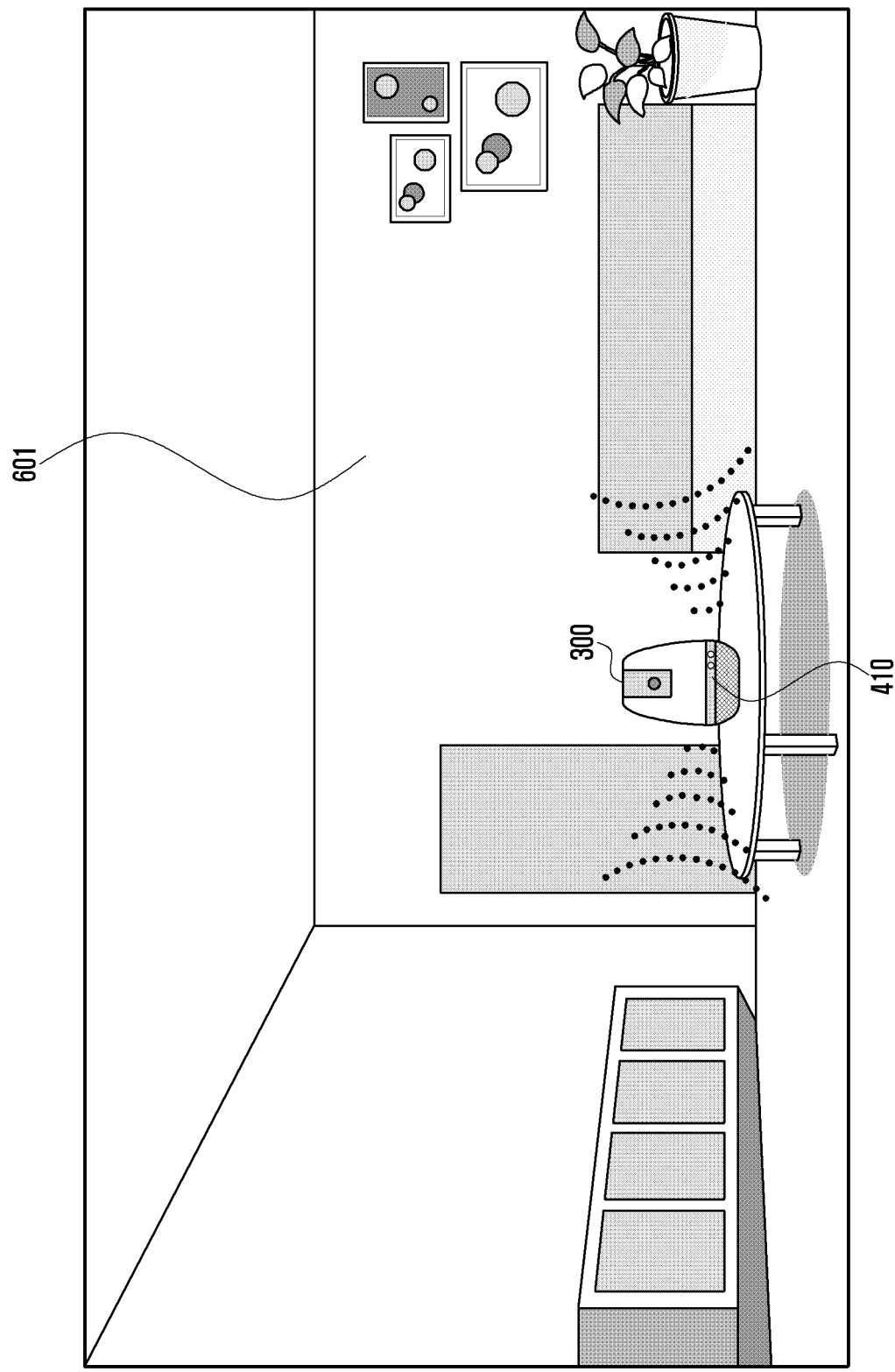

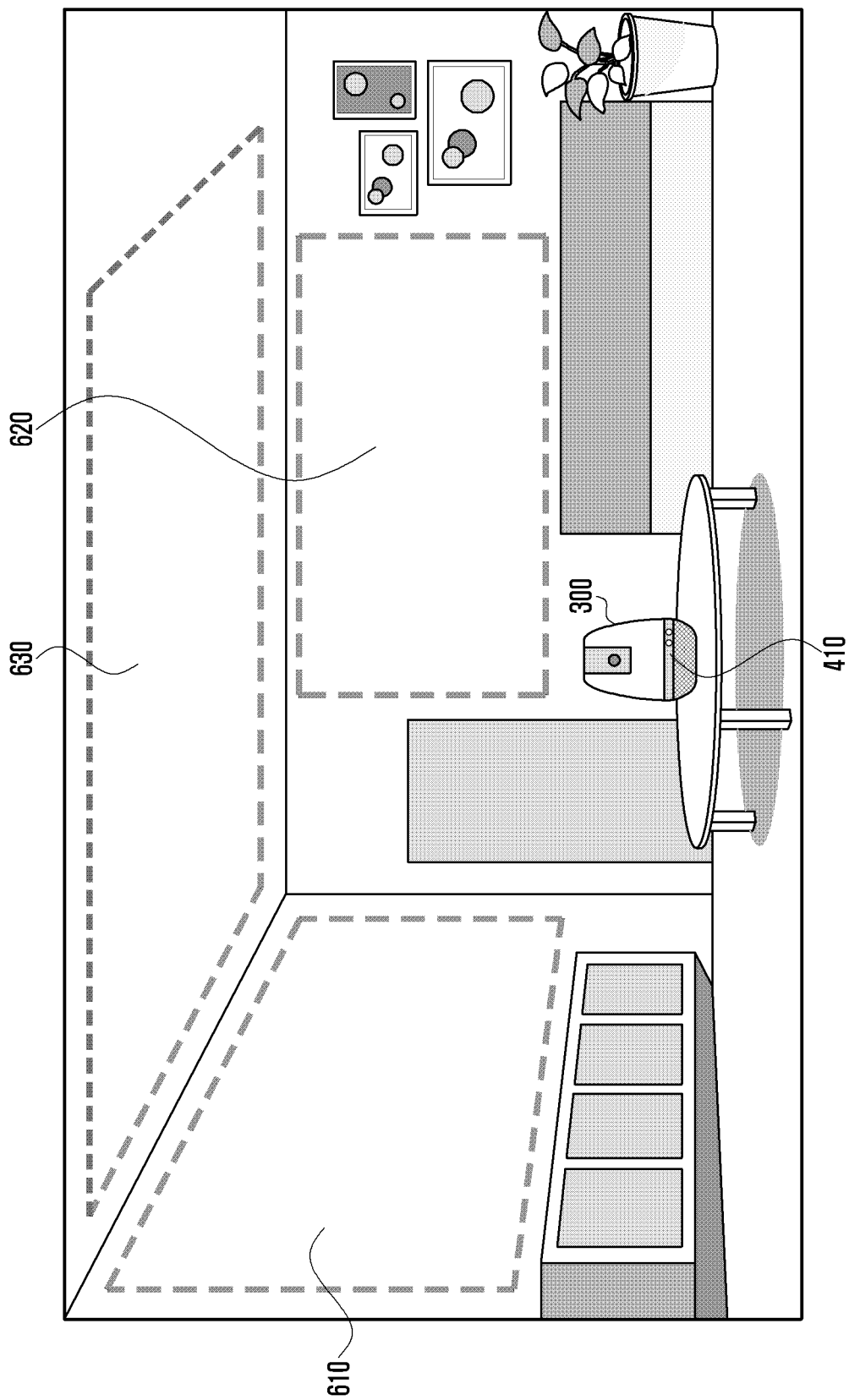

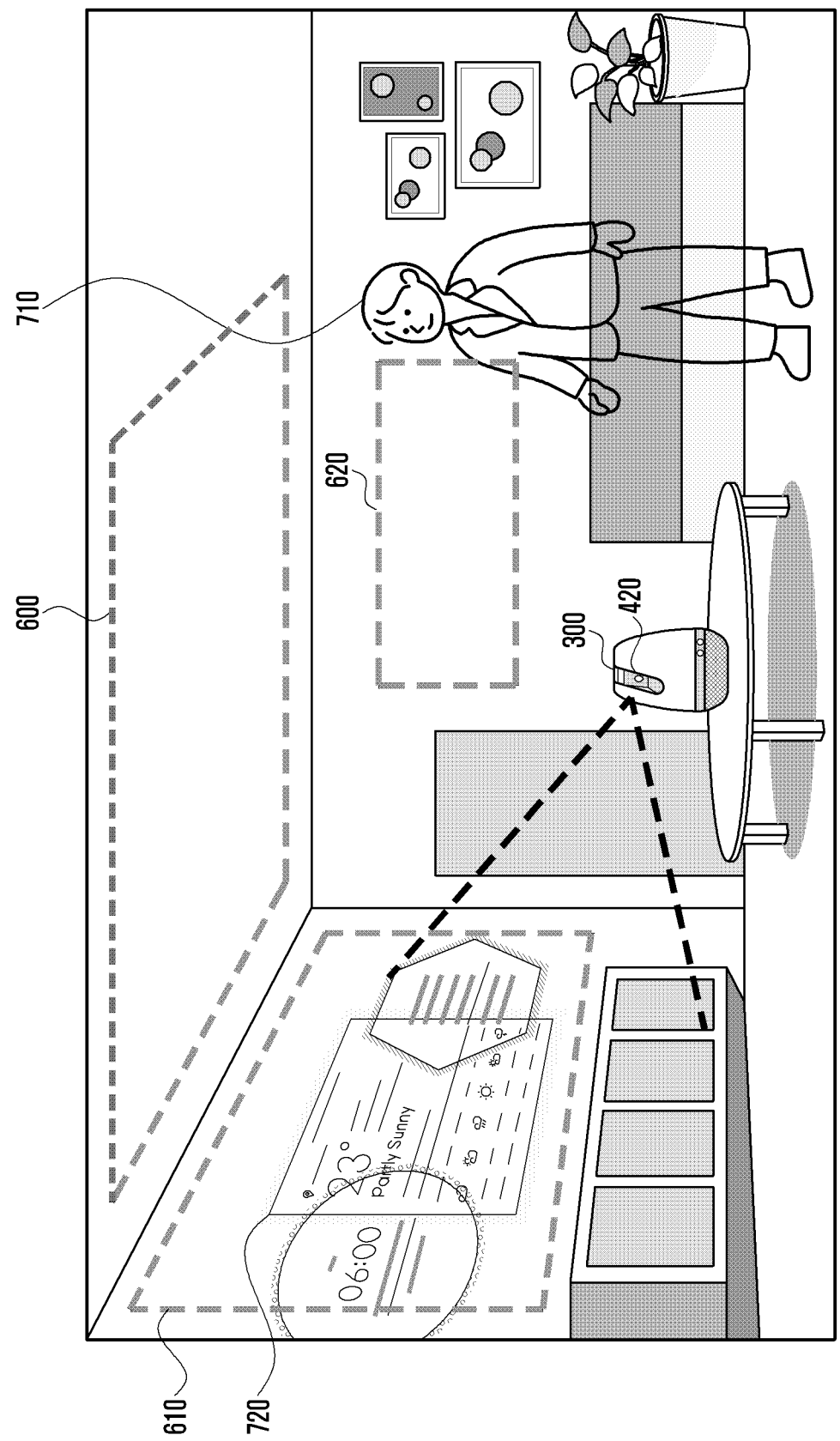

ELECTRONIC DEVICE FOR PROVIDING VISUALIZED ARTIFICIAL INTELLIGENCE SERVICE ON BASIS OF INFORMATION ABOUT EXTERNAL OBJECT, AND OPERATING METHOD FOR ELECTRONIC DEVICE

CROSS-REFERENCE TO RELATED APPLICATIONS

This application is a national stage of International Application No. PCT/KR2019/014326 designating the United States, filed on Oct. 29, 2019, in the Korean Intellectual Property Receiving Office and claiming priority to Korean Patent Application No. 10-2019-0020233, filed on Feb. 21, 2019, in the Korean Intellectual Property Office, the disclosures of which are incorporated by reference herein in their entireties.

BACKGROUND

Field

The disclosure relates to an electronic device and a method for operating the electronic device, and for example, to technology to provide a visualized artificial intelligence service based on information of an external object.

Description of Related Art

Various electronic devices, such as a smart phone, a tablet PC, a portable multimedia player (PMP), a personal digital assistant (PDA), a laptop personal computer (laptop PC), and a wearable device, have been spread.

Recently, the electronic device provides various artificial intelligence services that are available to a user. The artificial intelligence service may detect user's voice or operation gestures, and may execute various functions of the electronic device, corresponding to the detected operation gestures. After executing the function, the electronic device may provide the artificial intelligence service that provides the result of the process in a visualized form or in the form of voice.

The electronic device may be provided with a vision sensor for detecting a user's gesture in order to detect a user's gesture operation.

An electronic device may take an image using a vision sensor to detect a user's gesture. The electronic device may analyze an image taken by the vision sensor, and may obtain information related to an external object (e.g., a part of a user's body) included in the image. The electronic device may provide an artificial intelligent service based on the information related the external object. In order to provide the artificial intelligence service, an element requiring high speed and an element requiring high accuracy may be required, and in the case of processing all the elements through analysis of the image taken using the vision sensor, the processing speed may be reduced.

SUMMARY

According to various example embodiments of the disclosure, an electronic device may include: a rotatable vision sensor comprising sensing circuitry configured to detect an external object in a space in which the electronic device is disposed; a rotatable projector configured to output a screen into the space in which the electronic device is disposed; a memory storing spatial information of the space in which the electronic device is disposed; and a processor, wherein the processor is configured to: control the vision sensor to track the external object while being rotated, determine a position of the screen to be output by the projector based on the spatial information and information of the external object generated based on the tracking of the external object, and control the projector to output the screen to the determined position.

According to various example embodiments of the disclosure, a method for operating an electronic device may include: detecting an external object in a space in which the electronic device is disposed, and tracking, by a rotatable vision sensor, the external object while being rotated; determining, by a processor, a position of a screen to be output by a projector outputting the screen to the space in which the electronic device is disposed based on information of the external object generated based on the result of the tracking of the external object, and spatial information of the space in which the electronic device is disposed; and controlling the projector to output the screen to the determined position.

According to the electronic device and the method for operating the electronic device according to the various example embodiments of the disclosure, since the element requiring high speed (movement information of the external object) and the element requiring high accuracy (classification of the external object), which are obtained from the image taken by the vision sensor, are asynchronously processed, and synchronized in the final operation stage, both the speed and the accuracy can be improved.

According to the electronic device and the method for operating the electronic device according to the various example embodiments of the disclosure, since an event-based vision sensor is used, and data is transmitted in the case that an event occurs, the processing speed can be improved.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 6A and 6B are diagrams illustrating an example in which an electronic device determines an area onto which a screen is to be output according to various embodiments;

FIGS. 7A and 7B are diagrams illustrating an example in which an electronic device outputs a screen onto a predetermined area according to various embodiments;

In relation to the description of the drawings, the same or similar reference numerals may be used for the same or similar elements.

DETAILED DESCRIPTION

Figure 1:
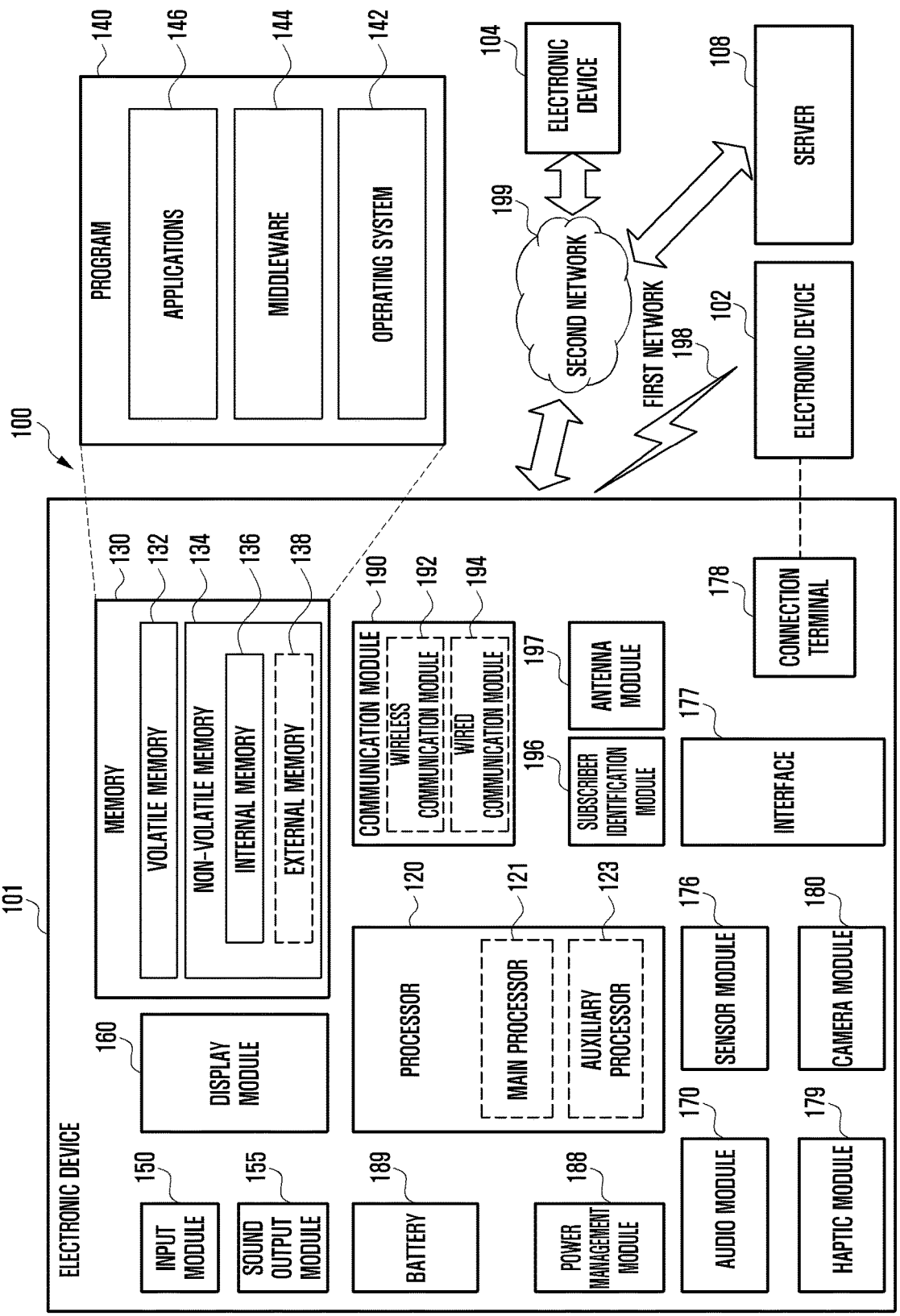
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196. The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
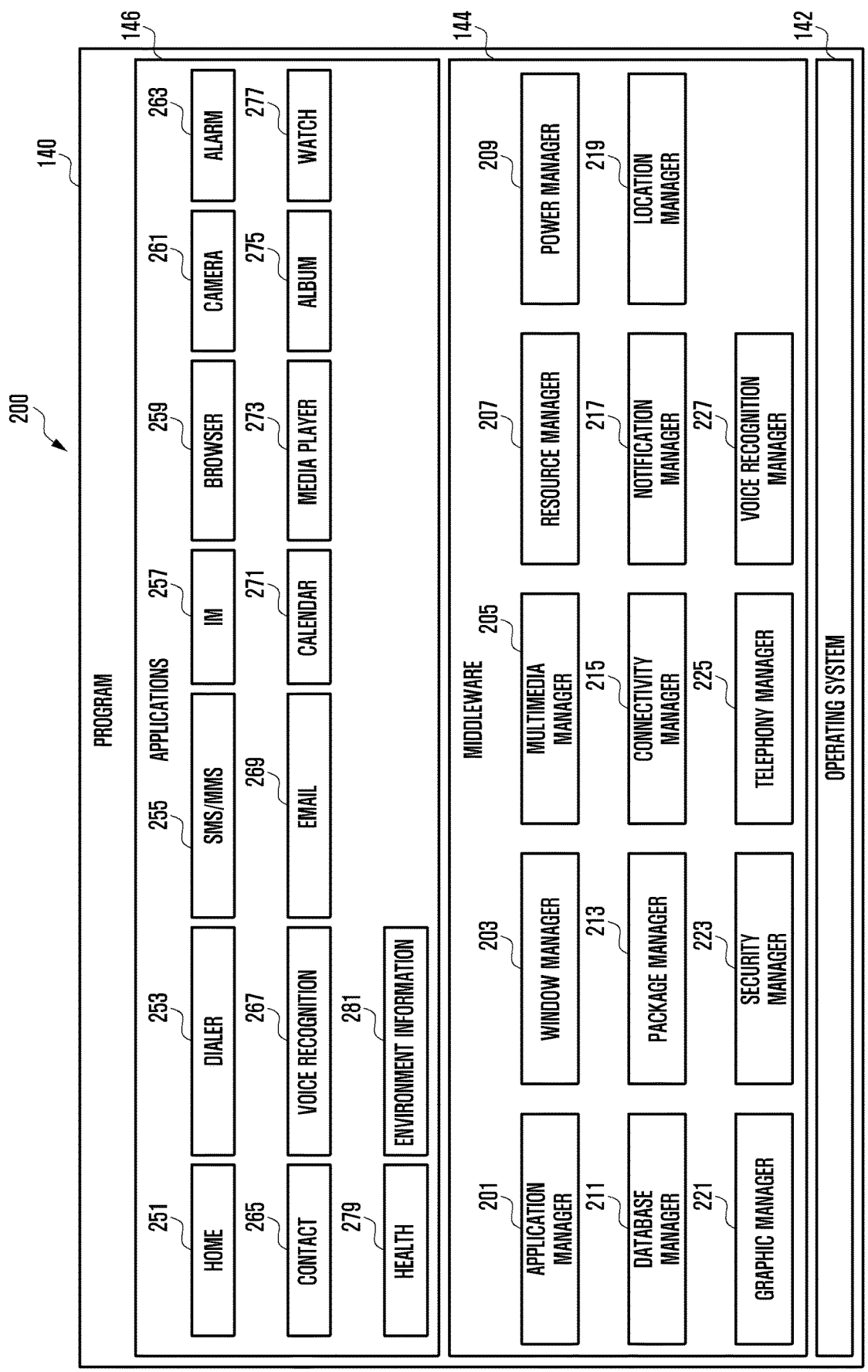
FIG. 2 is a block diagram illustrating an example program according to various embodiments.

FIG. 2 is a block diagram 200 illustrating an example program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bath™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
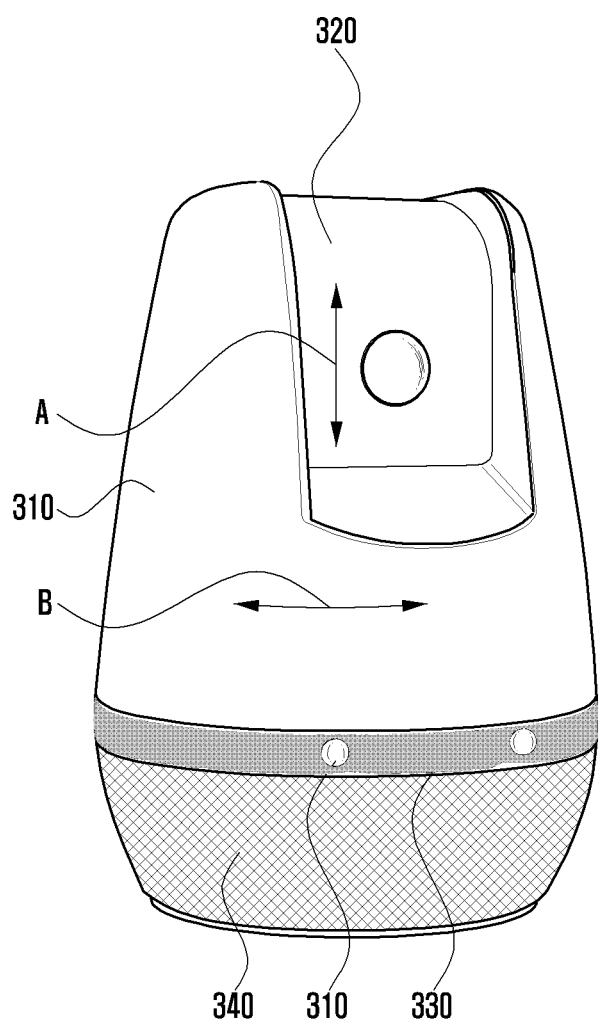
FIG. 3 is a diagram illustrating an electronic device according to various embodiments.

FIG. 3 is a diagram illustrating an example electronic device according to various embodiments.

Referring to FIG. 3, an electronic device 300 (e.g., electronic device 101 of FIG. 1) according to various embodiments of the disclosure may include a first housing 310, a projector module (e.g., including a projector) 320, a vision sensor module (e.g., including vision sensing circuitry) 330, and a second housing 340.

According to various embodiments of the disclosure, the first housing 310 may include a first actuator (not illustrated) to rotate the projector module 320. The first actuator may rotate the projector module 320 in a vertical direction (direction A), or may rotate the projector module 320 in a horizontal direction (direction B). In case of rotating the projector module 320 in direction A, only the projector module 320 may be rotated in direction A in a state where the first housing 310 is fixed. In case of rotating the projector module 320 in direction B, the first housing 310 and the projector module 320 may be rotated simultaneously.

According to various embodiments of the disclosure, the projector module 320 may output a screen under the control of a processor. The projector module 320 may output the screen in a manner that it projects light onto a partial area of a space in which the electronic device 300 is disposed. For this, the projector module 320 may include a light source outputting light for outputting the screen, and at least one lens projecting the light in a specific direction.

According to various embodiments of the disclosure, the vision sensor module 330 may include various circuitry and analyze the space in which the electronic device 300 is disposed. The vision sensor module 330 may take an image of the space in which the electronic device 300 is disposed, and may analyze the space in which the electronic device 300 is disposed in a manner of analyzing the taken image. The space in which the electronic device 300 is disposed may be analyzed by the vision sensor module 330 using various methods currently implemented or various methods to be implemented in the future. For example, the vision sensor module 330 may analyze the space in a manner of simulating an indoor space based on the result of analyzing a plurality of taken raw images or depth images (which are images including information about an object distance, and may refer, for example, to images that can be taken using a plurality of image sensors), and may obtain spatial information based on the result of the analysis.

According to various embodiments of the disclosure, the vision sensor module 330 may obtain information about the space in which the electronic device 300 is disposed and external objects (e.g., a part of a user's body and various products disposed in the space) existing around the electronic device 300.

According to various embodiments of the disclosure, the vision sensor module 330 may include a second actuator (not illustrated). The second actuator may rotate the vision sensor module 330 in the horizontal direction (direction B). The vision sensor module 330 may obtain information about the space in which the electronic device 300 is disposed or the external objects existing around the electronic device 300 while being rotated in the horizontal direction (direction B) based on the operation of the second actuator.

According to various embodiments of the disclosure, the second housing 340 may include various elements (e.g., processor, speaker, microphone, network interface, or input/output interface) of the electronic device 300. The speaker included in the second housing 340 may output various sounds based on the control of the processor. The microphone included in the second housing 340 may detect the various sounds based on the control of the processor. The microphone may refer, for example, to an array microphone having directivity. For example, the second housing 340 may include a plurality of microphones (e.g., four microphones), and the plurality of microphones may detect a sound output direction and sound.

Figure 4:
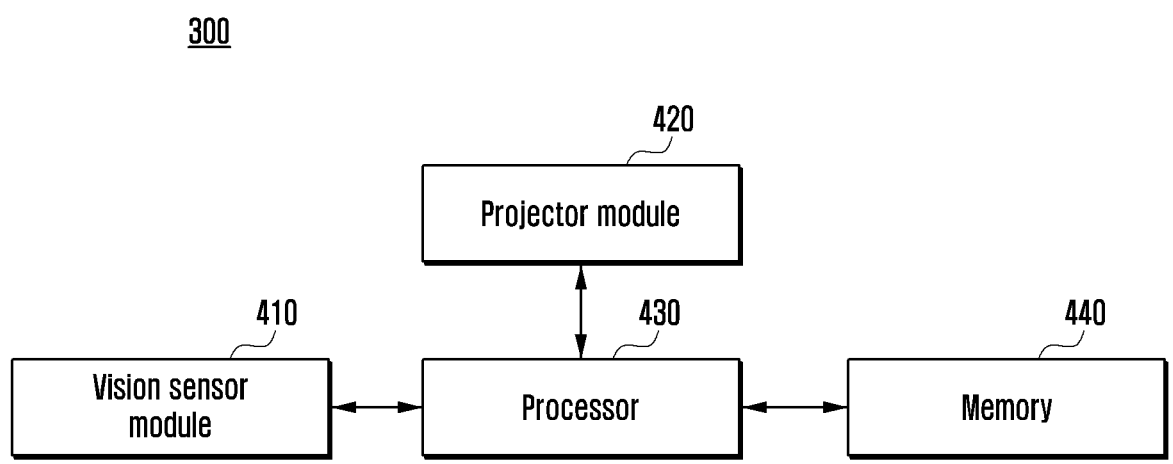
FIG. 4 is a block diagram illustrating an example configuration of an electronic device according to various embodiments.

FIG. 4 is a block diagram illustrating an example configuration of an electronic device according to various embodiments.

Referring to FIG. 4, an electronic device (e.g., electronic device 300 of FIG. 3) according to various embodiments of the disclosure may include a vision sensor module (e.g., including vision sensing circuitry) 410 (e.g., vision sensor module 330 of FIG. 3), a projector module (e.g., including a projector) 420 (e.g., projector module 320 of FIG. 3), a processor (e.g., including processing circuitry) 430, and a memory 440.

According to various embodiments of the disclosure, the vision sensor module 410 may include various circuitry and analyze a space in which the electronic device 300 is disposed. The vision sensor module 410 may take an image of the space in which the electronic device 300 is disposed, and may transmit the taken image to the processor 430. The processor 430 may analyze the space in which the electronic device 300 is disposed in a manner of analyzing the taken image. The processor 430 may perform an advance scanning of the space in which the electronic device 300 is disposed using the vision sensor module 410. The time when scanning the space in which the electronic device 300 is disposed may be variously implemented depending on settings. In case that the electronic device 300 is first disposed in the space (out-of-box), the processor 430 may scan the space in which the electronic device 300 is disposed using the vision sensor module 410, and may analyze the space.

According to various embodiments of the disclosure, the processor 430 may include various processing circuitry and obtain spatial information of the space using the vision sensor module 410. The obtained spatial information may be stored in the memory 440. The spatial information may refer, for example, to various kinds of information including the size of the space in which the electronic device 300 is disposed, the position of the space, the position of a wall included in the space, various variables (e.g., slope of the wall) that may indicate the flatness of the wall, and the kinds and sizes of various external objects included in the space in which the electronic device 300 is disposed. The processor 430 may determine at least one area to display a screen to be output by the projector module 420 based on the spatial information of the space in which the electronic device 300 is disposed. For example, the processor 430 may identify the flatness of a specific area based on the spatial information, and may determine the area having the flatness that is equal to or larger than a predetermined value as the area to display the screen to be output by the projector module 420.

According to various embodiments of the disclosure, the vision sensor module 410 may include various circuitry and track the external object existing in the space in which the electronic device 300 is disposed. The vision sensor module 410 may generate information related to movement of the external object through tracking of the external object. The information related to the movement of the external object may be whether the external object moves, a movement direction of the external object, or a movement distance of the external object. The vision sensor module 410 may be implemented as an event-based vision sensor to improve the tracking speed of the external object. The event-based vision sensor may refer, for example, to a sensor sensing an event related to the movement of the external object. For example, the event-based vision sensor does not transmit data to the processor 430 in case that the external object is in a standstill state, and in case that the external object moves, the event-based vision sensor may transmit information related to the movement to the processor 430. The event-based vision sensor may track the external object based on an amount of change of light from pixels corresponding to the external object being generated when the external object moves. Accordingly, in case that the vision sensor module 410 is the event-based vision sensor, it can transmit the information related to the movement to the processor 430 only when the external object moves, and thus the tracking speed of the external object can be improved.

According to various embodiments of the disclosure, the projector module 420 may include a projector and output a screen under the control of the processor 430. The projector module 420 may output the screen in a manner of projecting light onto a partial area of the space in which the electronic device 300 is disposed. For this, the projector module 420 may include a light source outputting light for outputting the screen, and at least one lens projecting the light in a specific direction. The processor 430 may control a first actuator (not illustrated) included in the projector module 420 to output the screen in the specific direction. The first actuator may rotate the lens included in the projector module 420 in a vertical direction or in a horizontal direction so as to output the screen in the specific direction based on the control of the processor 430.

According to various embodiments of the disclosure, the processor 430 may detect the external object using the vision sensor module 410. The detection of the external object may be detection of the existence of the external object in the space in which the electronic device 300 is disposed, or detection of the movement of the external object having already appeared. The processor 430 may control the vision sensor module 410 to track the external object in response to the detection of the external object. The processor 430 may identify the movement direction of the external object, and may control a second actuator included in the vision sensor module 410 so that the vision sensor module 410 is rotated in the same direction as the movement direction of the external object to track the external object.

According to various embodiments of the disclosure, the processor 430 may determine whether to perform an output of the screen based on the information of the external object. The processor 430 may determine to output the screen in response to identifying that the external object is the same as a predetermined object or the external object is an object having a similar shape using the information of the external object.

According to various embodiments of the disclosure, the processor 430 may process information requiring a fast processing speed and information requiring high accuracy, and may generate the information on the external object through synchronization of the processed information. The information requiring the fast processing speed may refer, for example, to information related to the tracking of the external object (e.g., movement direction of the external object). The information requiring the high accuracy may refer, for example, to information related to classification of the external object (e.g., whether the external object is a user, whether the external object is the user's face or user's hand).

According to various embodiments of the disclosure, the processor 430 may generate movement information including the movement direction of the external object requiring the fast processing speed using images collected by the vision sensor module 410. For example, if the vision sensor module 410 is implemented as a dynamic vision sensor (DVS) that is an embodiment of an event-based sensor, the processor 430 may identify the movement direction of the external object based on the amount of change of light from the pixels corresponding to the external object.

According to various embodiments of the disclosure, while generating the movement information of the object, the processor 430 may perform classification of the external object using the images collected by the vision sensor module 410. The classification of the external object may be performed by the processor 430, or may be performed by an external server (not illustrated) connected to the electronic device 300 in response to a request from the processor 430.

According to various embodiments of the disclosure, the processor 430 may generate the information of the external object through synchronization of the movement information of the external object with the classification of the external object.

According to various embodiments of the disclosure, since the processor 430 independently performs the generation of the movement information of the external object and the classification of the external object, the processor 430 may determine whether to output the screen based on the result of the classification of the external object after first determining the position of the screen to be output based on the movement information of the external object. The method for independently performing the generation of the movement information of the external object and the classification of the external object may improve the processing speed as compared with the method for simultaneously performing the movement information and the classification. Since the classification of the external object being performed by the external server or to be performed by the electronic device is performed by identifying the amount of change of light, the speed of the classification may be lower than the speed of the movement information generation, and in case of simultaneously performing the movement information generation and the external object classification, the processing speed may be reduced due to the external object classification.

According to various embodiments of the disclosure, the processor 430 may determine the position of the screen to be output by the projector module 420 based on the external object information and the spatial information generated based on the tracking result of the external object.

According to various embodiments of the disclosure, the processor 430 may determine the position of the screen to be output by the projector module 420 through selection of one of positions of at least one screen stored in the memory 440 in consideration of the position of the external object. For example, the processor 430 may determine the position of the screen to be output by the projector module 420 through selection of the position corresponding to a direction that is different from the direction in which the external object exists.

According to various embodiments of the disclosure, the processor 430 may control the projector module 420 to output the screen to the determined position. The processor 430 may control the first actuator included in the projector module 420 to output the screen to the determined position. The projector module 420 may be rotated in the horizontal direction or in the vertical direction to be moved to the determined position by the first actuator. After being rotated, the projector module 420 may output the screen to the determined position.

According to various embodiments of the disclosure, the processor 430 may provide various screens based on the result of the classification of the external object. The processor 430 may provide different screens depending on the result of the classification of the external object. The processor 430 may identify one of a plurality of users based on the result of the classification of the external object, and may output the screen corresponding to the identified user. For example, the processor 430 may identify that the external object is a younger user based on the result of the classification of the external object, and may output an age-appropriate screen. For example, the processor 430 may identify one of the plurality of users based on the result of the classification of the external object, and may output the screen corresponding to the identified user.

According to various embodiments of the disclosure, the processor 430 may perform pre-distortion for the output screen based on information about an area onto which the screen is to be output. Depending on the characteristic of the area onto which the screen is to be output, there may be a problem in that a user viewing the screen views a distorted screen. For example, depending on the relative positions between the area onto which the screen is to be output and the user, there may be a problem in that the user views the screen having a distorted shape. To address the above problem, the processor 430 may generate a pre-distorted screen based on the information on the area onto which the screen is to be output, and may control the projector module 420 to output the pre-distorted screen.

According to various embodiments of the disclosure, the processor 430 may measure illumination of the space in which the electronic device 300 is disposed using an illuminance sensor (e.g., illuminance sensor included in the sensor module 176 of FIG. 1). The processor 430 may change the characteristic of the screen to be output based on the measured illumination. For example, if the measured illumination is lower than a predetermined value, the processor 430 may increase contrast in order to increase sharpness of the screen.

According to various embodiments of the disclosure, the processor 430 may measure a distance between the external object and the electronic device 300 using the vision sensor module 410. The processor 430 may change the characteristic of the screen to be output based on the measured distance. For example, the processor 430 may change the layout of the screen being output depending on the measured distance. The above embodiment will be described in greater detail below with reference to FIGS. 15, 16 and 17.

According to various embodiments of the disclosure, the processor 430 may identify that the vision sensor module 410 detects the movement of the external object. In response to the detection of the movement of the external object, the processor 430 may control the vision sensor module 410 to track the external object, and may change the output position of the screen based on the changed position of the external object.

According to various embodiments of the disclosure, the processor 430 may detect reception of sound through the microphone, and may identify the sound output direction based on the information transmitted from the microphone. In case that the microphone is a directional array microphone, the processor 430 may identify the sound output direction. The processor 430 may determine whether to process an operation corresponding to the sound based on the external object position measured by the vision sensor module 410 and the sound direction. If the sound includes data requesting processing of a specific operation (e.g., phone call request to a specific user), the operation corresponding to the sound may refer, for example, to the operation for processing the specific operation (e.g., call to a specific user). The processor 430 may process the operation corresponding to the sound in response to identifying that the external object position and the sound direction coincide with each other. The processor 430 may disregard the sound in response to identifying that the external object position and the sound direction do not coincide with each other. In processing the operation corresponding to the sound as described above, malfunction being generated due to processing of sound from another object (e.g., another user) that is not the external object can be prevented and/or avoided in consideration of both the external object position and the sound direction.

Figure 5:
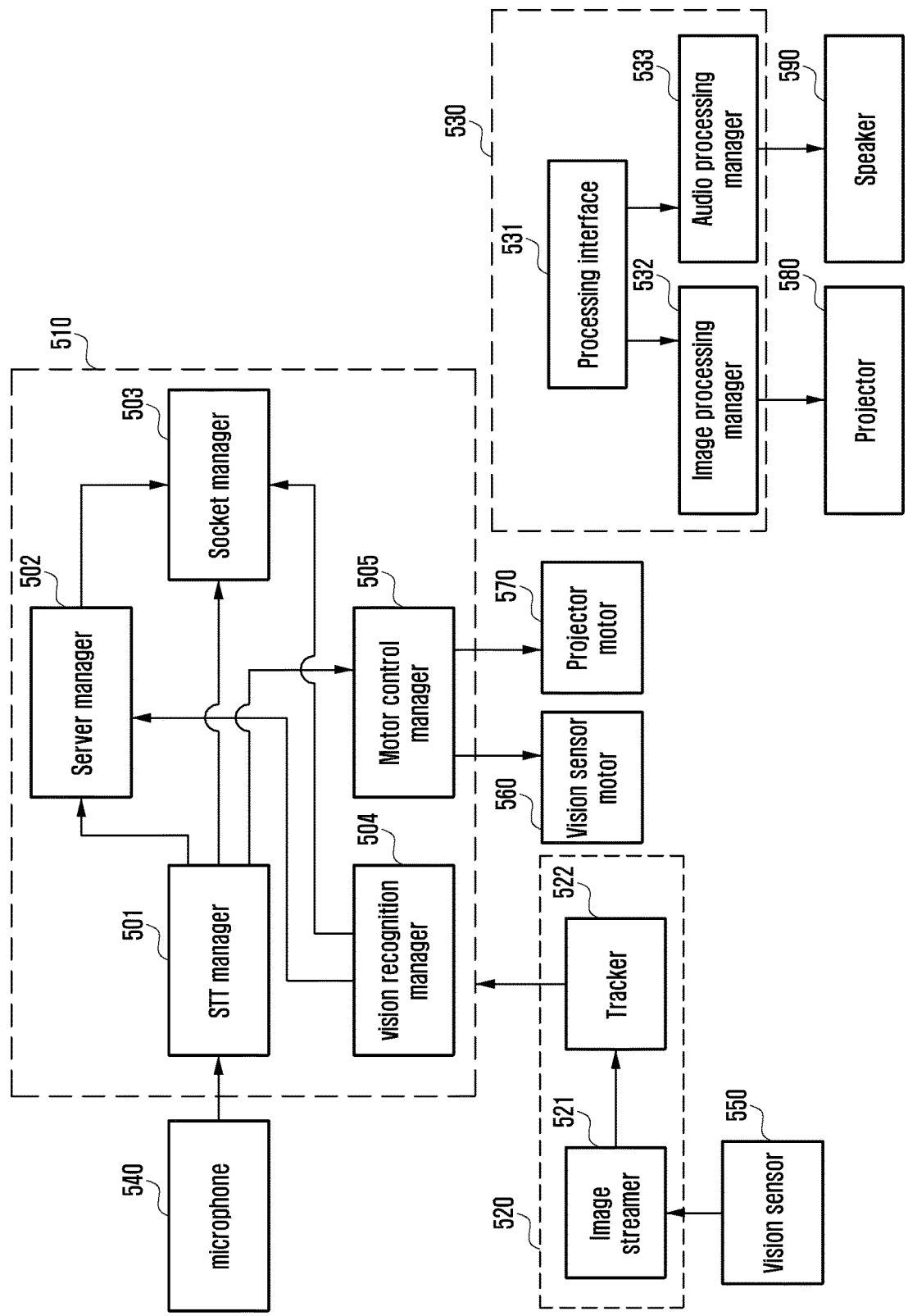
FIG. 5 is a block diagram illustrating example elements implemented in software of an electronic device according to various embodiments.

FIG. 5 is a diagram illustrating example elements implemented in software (e.g., executable program instructions) of an electronic device according to various embodiments.

Referring to FIG. 5, example elements of an electronic device 300, being implemented in software, including, for example, executable program instructions, according to various embodiments of the disclosure are illustrated. According to various embodiments of the disclosure, a job processing agent module 510 may include a speech-to-text (STT) manager 501 converting sound received through a microphone 540 into a text, a server manager 502 transmitting the text corresponding to the sound transmitted by the STT manager 501 to an external server, or receiving the classification result of an external object from an external server performing classification of the external object, a socket manager 503 including an interface transmitting data transmitted by the STT manager 501, data transmitted by the server manager 502, and data transmitted by a vision recognition manager 504 to a content output module 503, the vision recognition manager 504 receiving the data from a tracker 522 tracking the external object, and a motor control manager 505 controlling a projector motor (e.g., first actuator) 570 and a vision sensor motor (e.g., second actuator) 560.

According to various embodiments of the disclosure, a vision sensor processing module 520 may include an image streamer 521 receiving an image stream from a vision sensor 550, and the tracker 522 tracking the external object based on the image stream transmitted by the image streamer 521.

According to various embodiments of the disclosure, a content output module 530 may include a processing interface 531 receiving data from the socket manager 503 and transmitting the received data to an image processing manager 532 or an audio processing manager 533, the image processing manager 532 controlling a projector 580 to output a screen based on the data received from the processing interface 531, and the audio processing manager 533 controlling a speaker 590 to output sound based on the data received from the processing interface 531.

According to various embodiments of the disclosure, a vision sensor 550 may detect movement of the external object, take an image including the external object, and then transmit the taken image stream to the image streamer 521. The image streamer 521 may preprocess the image stream taken by the vision sensor 550, and may transmit the preprocessed image stream to the tracker 522. The tracker 522 may track the movement direction of the external object using the preprocessed image stream, and may transmit the movement direction of the external object to the vision recognition manager 504. The vision recognition manager 504 may identify the movement direction of the external object, being transmitted by the tracker 522, and may transmit the identified movement direction to the motor control manager 505. The motor control manager 505 may change the direction in which the vision sensor 550 takes an image or the direction of the screen being output by the projector 580 through control of the vision sensor motor 560 or the projector motor 570 based on the movement direction of the external object.

According to various embodiments of the disclosure, the image processing manager 532 may process the screen to be output by the projector 580 based on the classification result of the external object. The socket manager 503 may transmit the classification result of the external object to the image processing manager 532 through the processing interface 531. The classification of the external object may be performed by the electronic device 300 or external server (not illustrated). In case that the electronic device 300 performs classification of the external object, the vision recognition manager 504 may transmit the classification result of the external object to the socket manager 503. In case that the external server performs the classification of the external object, the server manager 502 may receive the classification result of the external object from the external server, and may transmit the classification result of the external object to the socket manager 503.

FIGS. 6A and 6B are diagrams illustrating an example in which an electronic device determines an area to output a screen according to various embodiments.

FIG. 6A illustrates an electronic device (e.g., electronic device 300 of FIG. 3) and a space 601 in which the electronic device 300 is disposed. The electronic device 300 may analyze the space in which the electronic device 300 is disposed using a vision sensor module (e.g., vision sensor module 410 of FIG. 4). The vision sensor module 410 may take an image of the space in which the electronic device 300 is disposed, and may transmit the taken image to a processor 430. The processor 430 may analyze the space in which the electronic device 300 is disposed through analysis of the taken image.

According to various embodiments of the disclosure, the electronic device 300 may obtain spatial information of the space using the vision sensor module 410. The spatial information may refer, for example, to various kinds of information including the size of the space in which the electronic device 300 is disposed, the position of the space, the position of a wall included in the space, various variables (e.g., slope of the wall) that may indicate the flatness of the wall, and the kinds and sizes of various external objects included in the space in which the electronic device 300 is disposed.

FIG. 6B is a diagram illustrating an embodiment in which an electronic device (e.g., electronic device 300 of FIG. 3) determines at least one area onto which a screen to be output by a projector module (e.g., projector module 420 of FIG. 4) is to be displayed based on spatial information.

According to various embodiments of the disclosure, the electronic device 300 may determine at least one area 610, 620, and 630 for displaying a screen to be output by the projector module 420 based on the spatial information of the space in which the electronic device 300 is disposed. For example, the processor 430 may identify the flatness of a specific area based on the spatial information, and may determine the areas 610, 620, and 630 having the flatness that is equal to or larger than a predetermined value as the areas to display the screen to be output by the projector module 420.

Figure 7A:
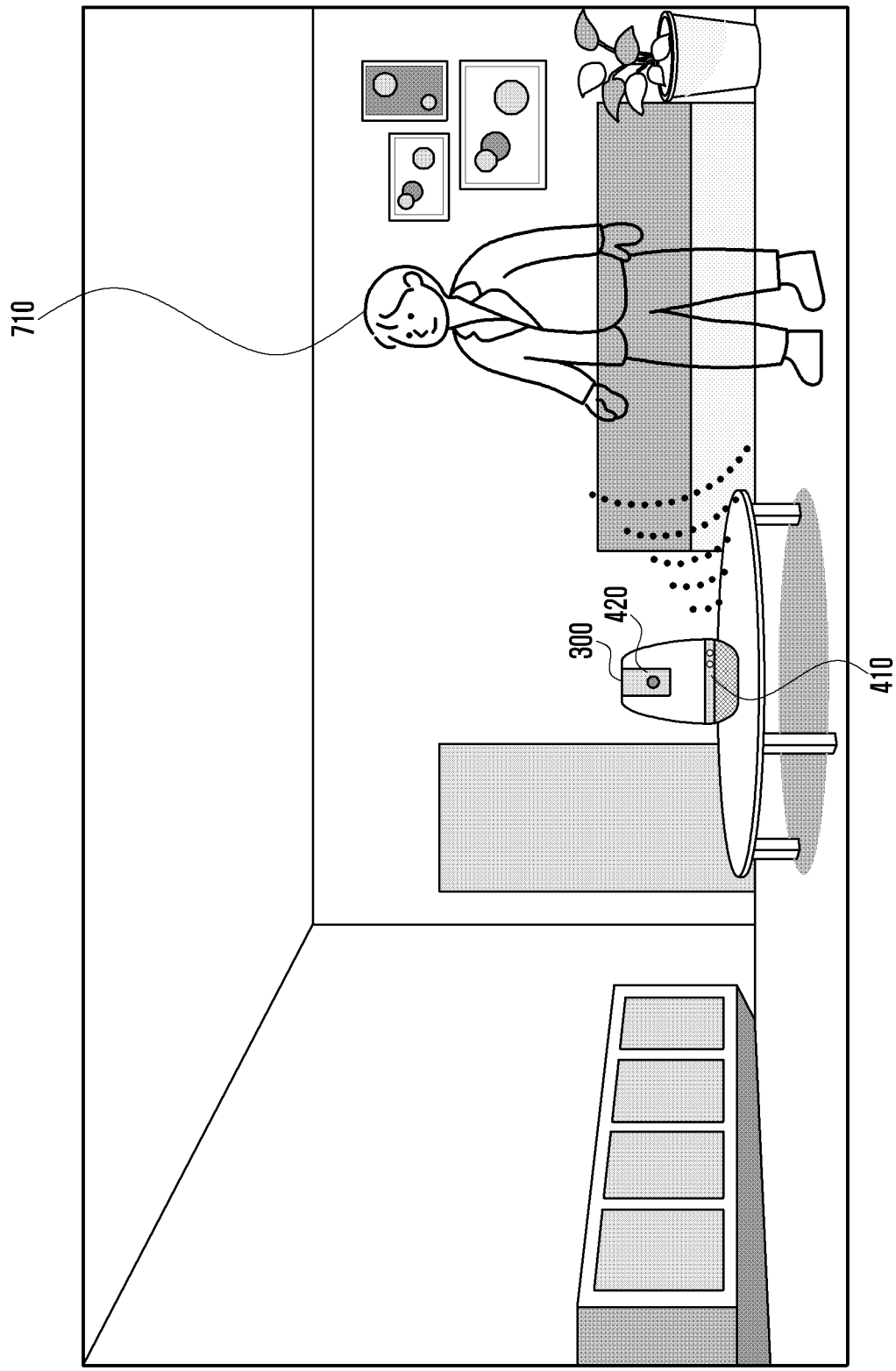

According to various embodiments of the disclosure, the electronic device 300 may track the external object using the vision sensor module 410, and the vision sensor module 410 may generate information related to the movement of the external object through tracking of the external object. The information related to the movement of the external object may be whether the external object moves, a movement direction of the external object, or a movement distance of the external object. The electronic device 300 may select one of the areas 610, 620, and 630 determined based on the information related to the movement of the external object, and may determine the selected area as the position of the screen to be output by the projector module 420. Referring to FIGS. 7A and 7B, example contents for determining the position of the screen to be output by the projector module 420 based on the information related to the movement of the external object will be described.

FIGS. 7A and 7B are diagrams illustrating an example in which an electronic device outputs a screen onto a determined area according to various embodiments.

According to various embodiments of the disclosure, an electronic device (e.g., electronic device 300 of FIG. 3) may track an external object 710 using a vision sensor module (e.g., vision sensor module 410 of FIG. 4), and the vision sensor module 410 may generate information of the external object 710 through tracking of the external object 710. The information of the external object 710 may refer, for example, to various kinds of information including the position of the external object 710, the movement direction of the external object 710, the movement speed of the external object 710, and the movement distance of the external object 710.

Referring to FIG. 7A, the electronic device 300 may detect the appearance of the external object 710 based on an image taken by the vision sensor module 410. For example, the vision sensor module 410 may take images every predetermined period, and may detect the appearance of the external object 710 based on the taken images.

According to various embodiments of the disclosure, the vision sensor module 410 may be implemented as an event-based vision sensor to improve the tracking speed of the external object 710. The event-based vision sensor may refer, for example, to a sensor sensing an event related to the movement of the external object 710. For example, the event-based vision sensor does not transmit data to the processor 430 in case that the external object 710 is in a standstill state, and in case that the external object moves, the event-based vision sensor may transmit information related to the movement to the processor 430. The event-based vision sensor may track the external object based on an amount of change of light from pixels corresponding to the external object being generated when the external object moves. Accordingly, in case that the vision sensor module 410 is the event-based vision sensor, it can transmit the information related to the movement to the processor 430 only when the external object moves, and thus the tracking speed of the external object can be improved.

According to various embodiments of the disclosure, the electronic device 300 may select one of areas 610, 620, and 630 determined based on the information related to the movement of the external object, and may determine the selected area as the position of the screen to be output by the projector module 420. For example, the electronic device 300 may determine the position of the screen to be output by the projector module 420 through selection of the areas 610, 620, and 630 corresponding to a different direction that is not the direction 710 in which the external object exists. For convenience in explanation, description will be made on the assumption that a specific area 610 is determined as the position output by the projector module 420.

Referring to FIG. 7B, the electronic device 300 may rotate the projector module 420 toward the determined area 610. The electronic device 300 may rotate the projector module 420 to output the screen 720 onto the determined area 610 through control of the first actuator included in the projector module 420.

Although FIG. 7B illustrates an example in which the screen 720 is output onto the determined area 610, the output area of the screen 720 may be changed depending on the movement of the external object 710. The above example will be described in greater detail below with reference to FIGS. 8A, 8B and 8C.

Figure 8A:
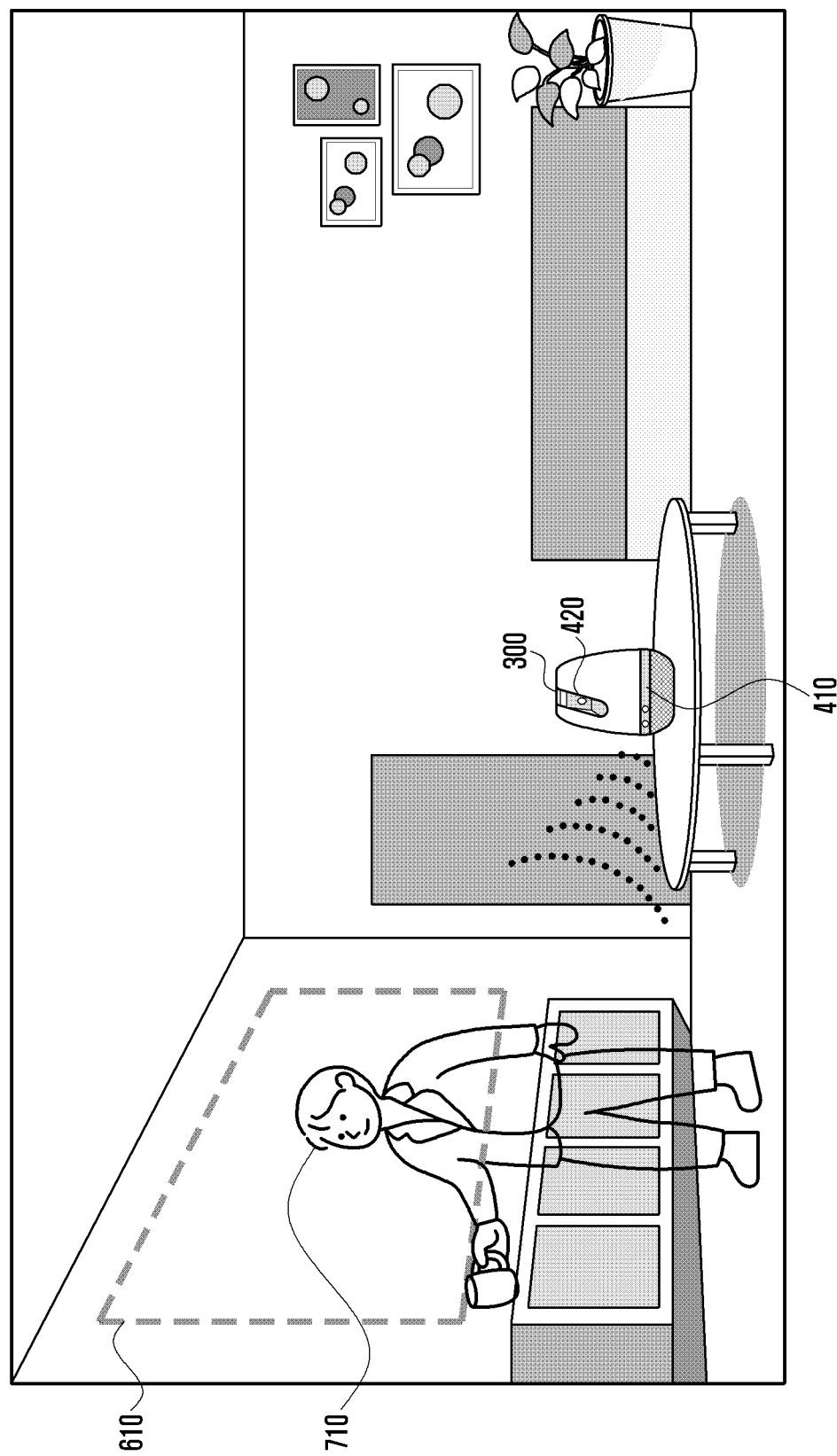
FIGS. 8A, 8B and 8C are diagrams illustrating an example in which an electronic device changes an area to output a screen corresponding to movement of an external object according to various embodiments.
Figure 8B:
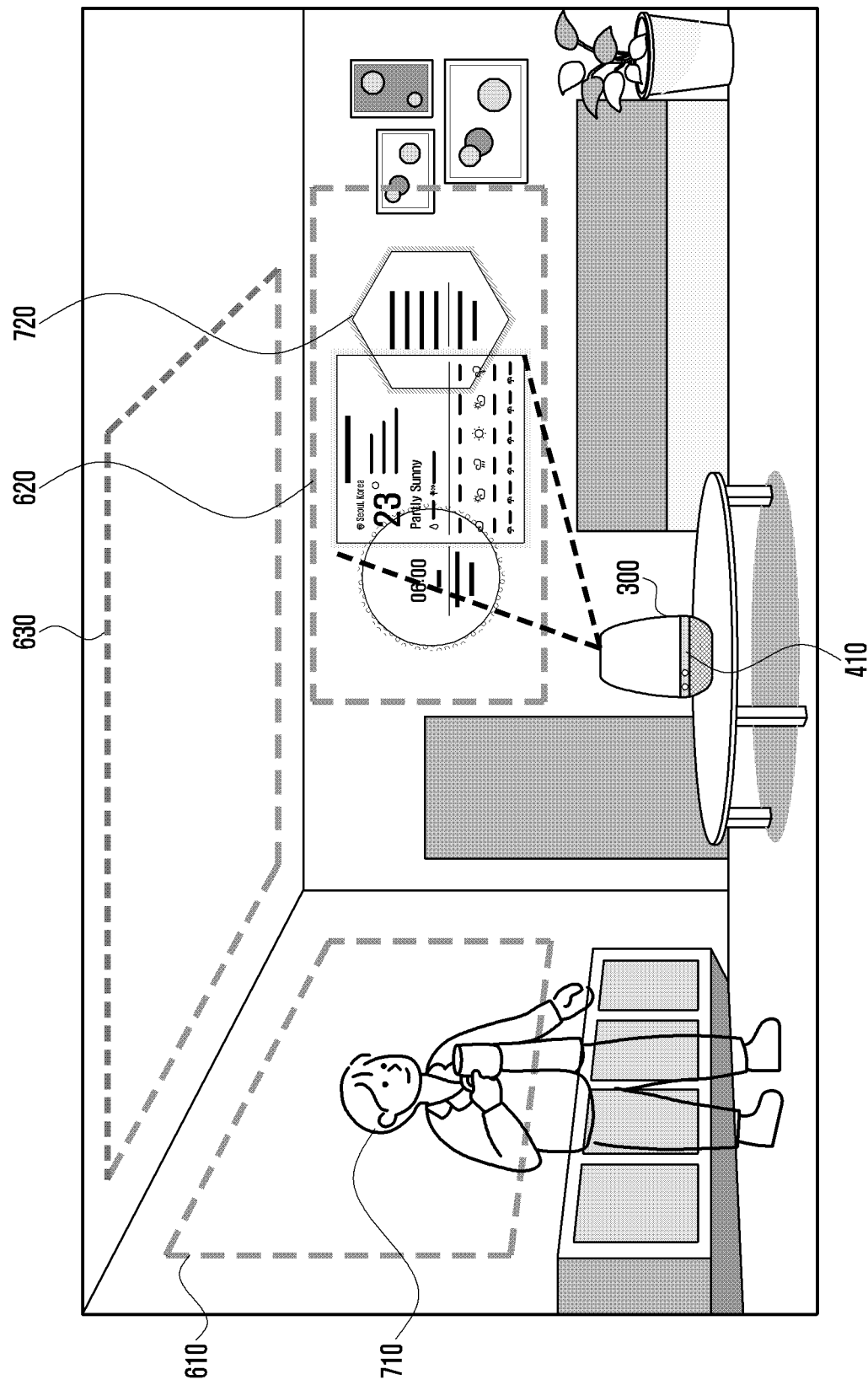
Figure 8C:
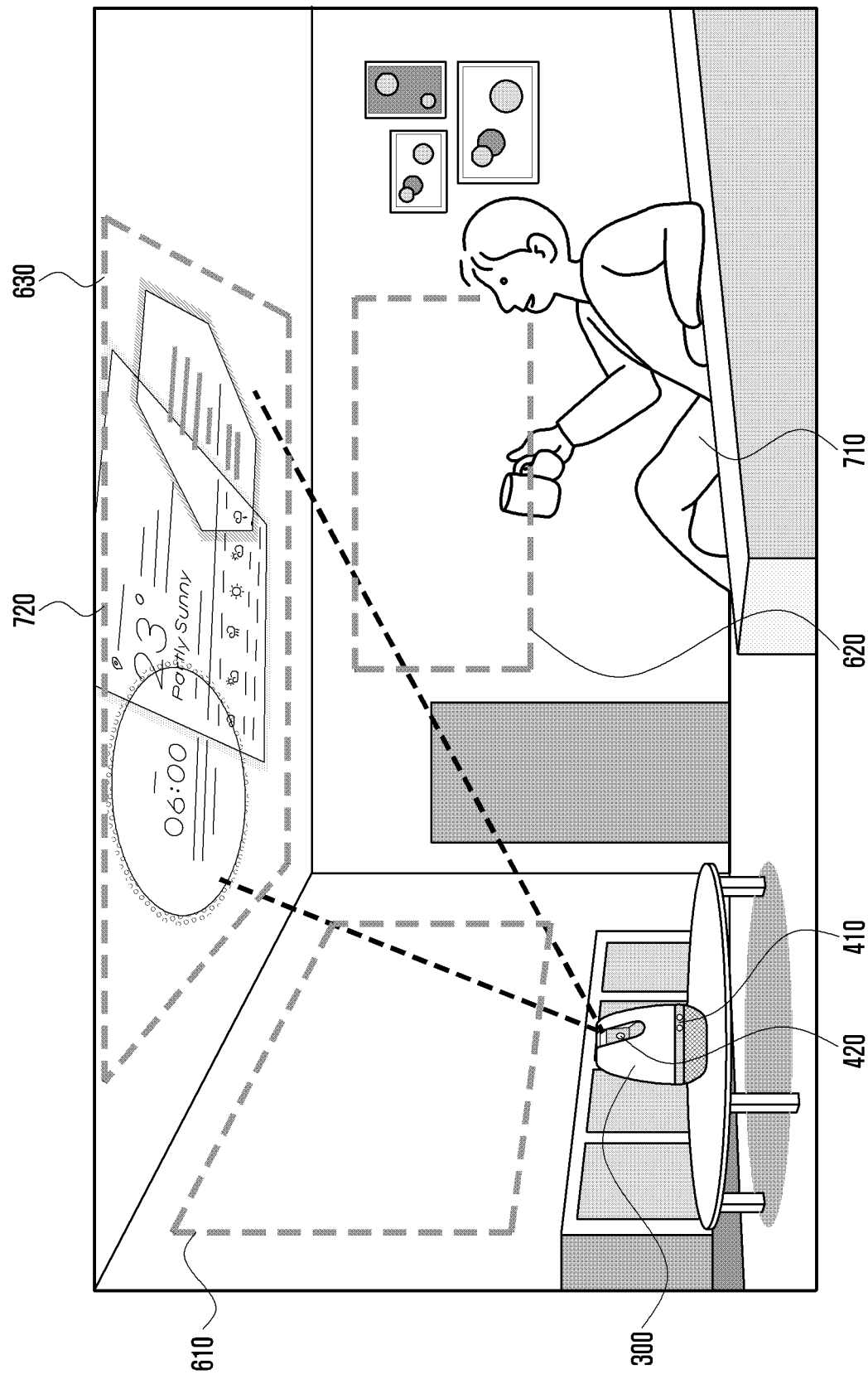

FIGS. 8A, 8B and 8C are diagrams illustrating an example in which an electronic device changes an area to output a screen corresponding to movement of an external object according to various embodiments.

According to various embodiments of the disclosure, an electronic device (e.g., electronic device 300 of FIG. 3) may identify detection of the movement of an external object using a vision sensor module (e.g., vision sensor module 410 of FIG. 4). The electronic device 300 may control the vision sensor module 410 to track the external object in response to the detection of the movement of the external object. The electronic device 300 may rotate the vision sensor module 410 to track the external object through control of a second actuator included in the vision sensor module 410.

Referring to FIG. 8A, the electronic device 300 may analyze the result of tracking the external object, and may identify that the external object (e.g., external object 710 of FIG. 7A) has moved. The electronic device 300 may identify the changed position of the external object 710, and may determine whether to change the output position of the screen (e.g., screen 720 of FIG. 7B) based on the changed position.

Referring to FIG. 8B, the changed position of the external object 710 is near the area 610 onto which the existing screen 710 is output, and in case that the projector module 420 outputs the screen onto the determined area 610, a situation in which light corresponding to the screen is reflected by the external object 710 may occur. The electronic device 300 may determine to change the output position of the screen 720 based on the changed position of the external object 710.

Referring to FIG. 8B, the electronic device 300 may determine to change the output position of the screen 720 to another area 620 based on the changed position of the external object 710, and may rotate the projector module 420 to output the screen 720 onto the changed area 620 through control of the first actuator included in the projector module 420.

Referring to FIG. 8C, the electronic device 300 may determine to change the output position of the screen 720 to another area 630 based on the changed position of the external object 710, and may rotate the projector module 420 to output the screen 720 onto the changed area 630 through control of the first actuator included in the projector module 420.

Figure 9:
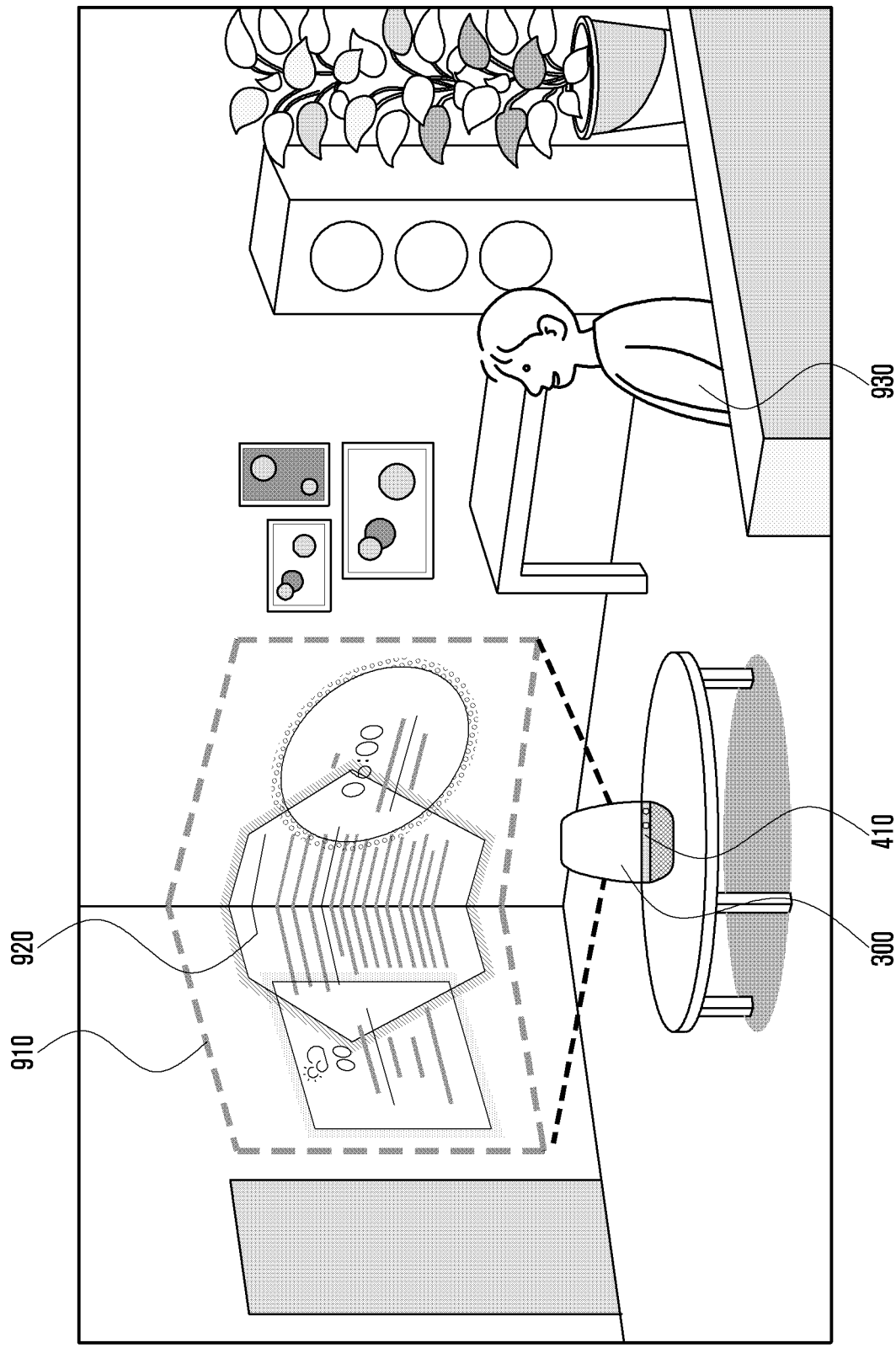
FIG. 9 is a diagram illustrating an example in which an electronic device performs pre-distortion for a screen based on information about an area to output the screen according to various embodiments.

FIG. 9 is a diagram illustrating an example in which an electronic device performs pre-distortion for a screen based on information about an area to output the screen according to various embodiments.

Referring to FIG. 9, an electronic device 300 according to various embodiments of the disclosure may perform pre-distortion for an output screen based on information about an area 910 onto which the screen is to be output. Depending on the characteristic of the area 910 onto which the screen is to be output, there may be a problem in that a user 930 viewing the screen views a distorted screen. For example, depending on the different relative distance between the area 910 to output the screen and the user 930 (in FIG. 9, as the screen is closer to a center part of the area 910 to output the screen, the distance between the user 930 and the area 910 to output the screen may be increased), there may be a problem in that the user views the screen having a distorted shape. To address the above problem, the electronic device 300 may generate a pre-distorted screen 920 based on the information on the area 910 onto which the screen is to be output, and may control the projector module 420 to output the pre-distorted screen 920.

Figure 10:
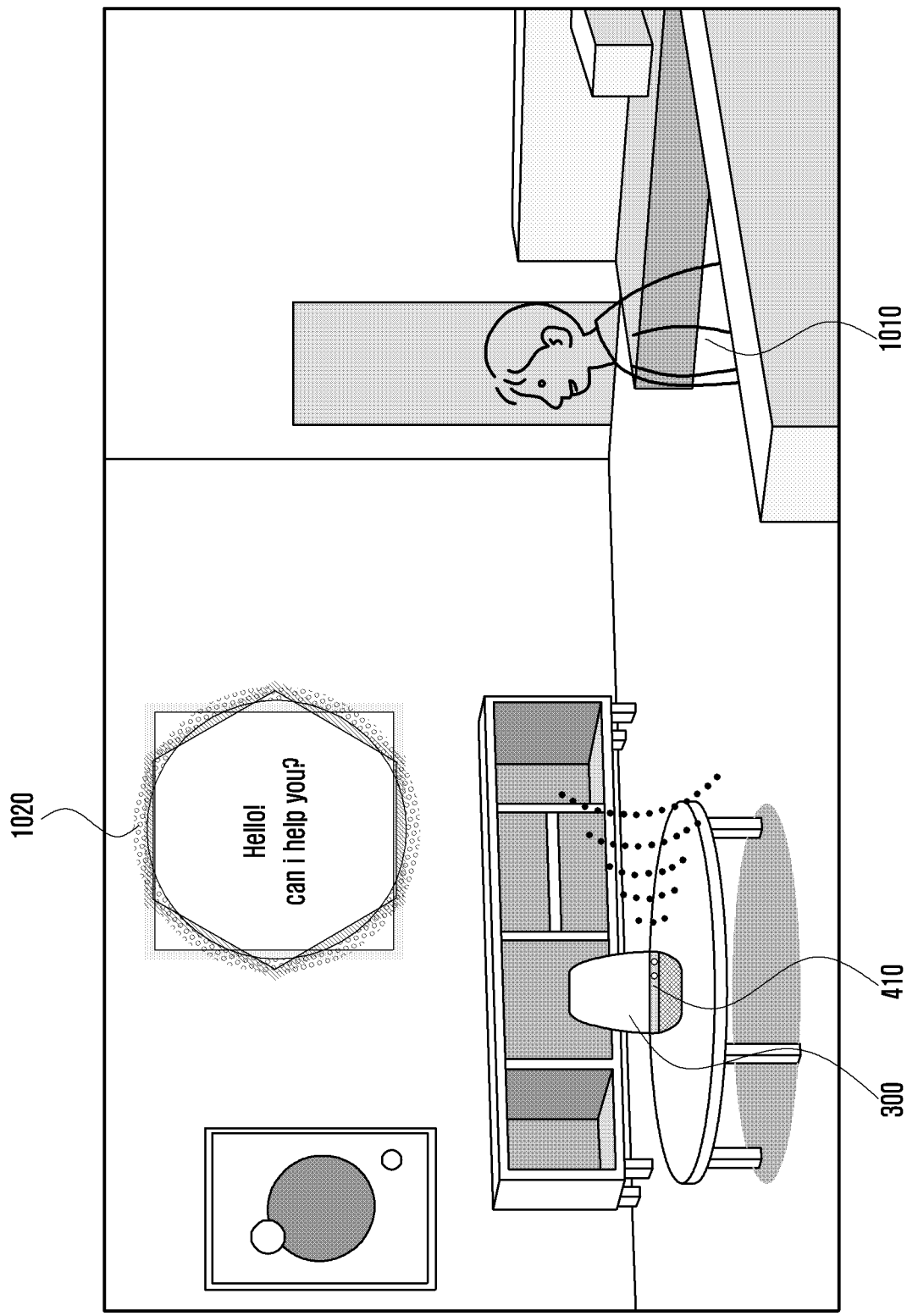
FIG. 10 is a diagram illustrating an example in which an electronic device is activated according to various embodiments.

FIG. 10 is a diagram illustrating an example in which an electronic device is activated according to various embodiments.

Referring to FIG. 10, an electronic device (e.g., electronic device 300 of FIG. 3) according to various embodiments of the disclosure may track a user 1010 every predetermined period using a vision sensor module (e.g., vision sensor module 410 of FIG. 4). The vision sensor module 410 may take images including the user 1010 while tracking the user 1010. A processor (e.g., processor 430 of FIG. 4) may analyze the images taken by the vision sensor module 410, and may identify the behavior of the user 1010. The processor 430 may identify that the behavior of the user 1010 is a behavior to activate the electronic device 300 (e.g., behavior to view the electronic device 300), and may activate various components of the electronic device 300. For example, the processor 430 may control a projector module (e.g., projector module 420 of FIG. 4) to output a specific screen 1020.

Figure 11:
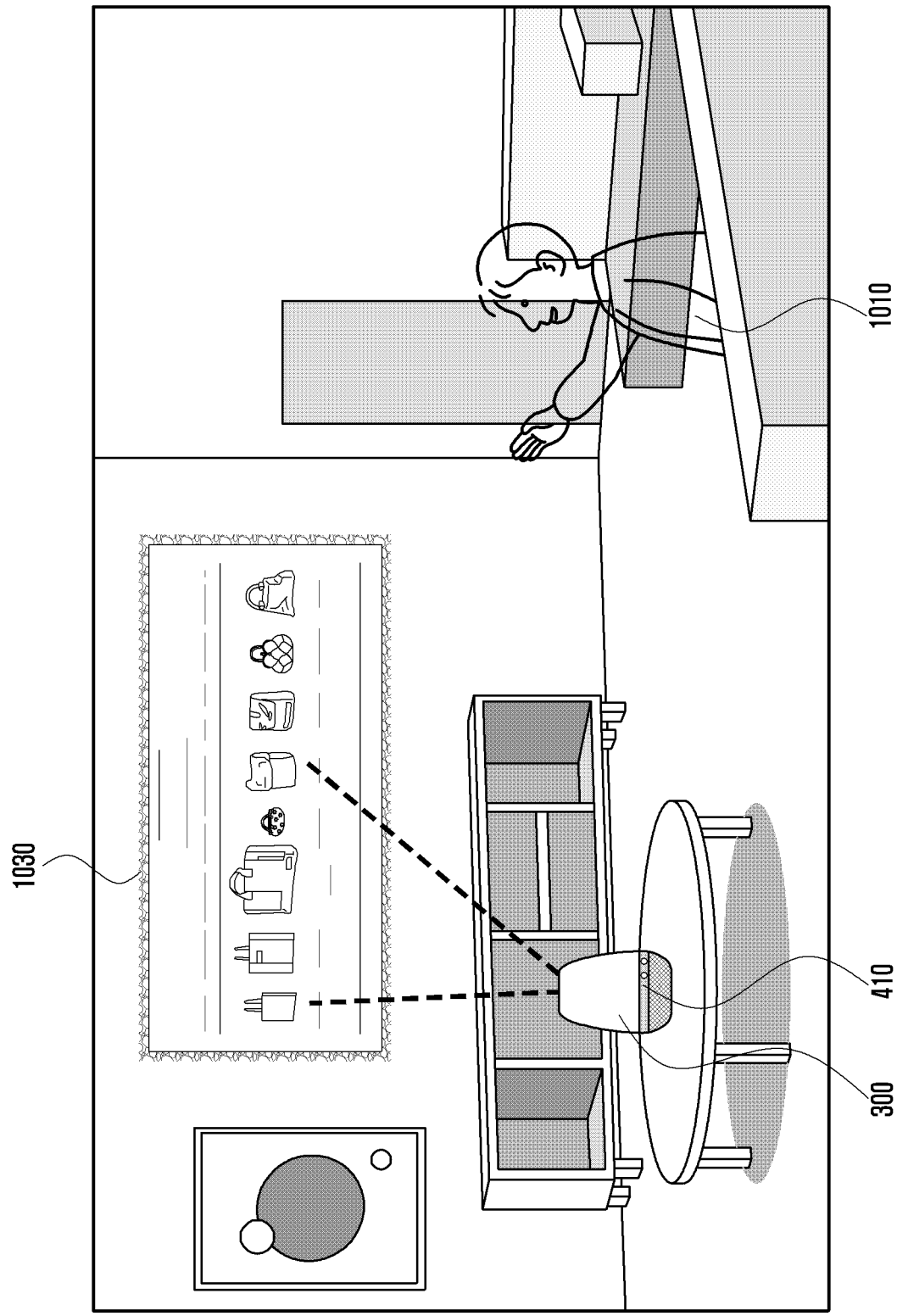
FIG. 11 is a diagram illustrating an example in which an electronic device is controlled using a gesture according to various embodiments.

FIG. 11 is a diagram illustrating an example in which an electronic device is controlled using a gesture according to various embodiments.

Referring to FIG. 11, an electronic device (e.g., electronic device 300 of FIG. 3) according to various embodiments of the disclosure may track a user 1010 every predetermined period using a vision sensor module (e.g., vision sensor module 410 of FIG. 4). The vision sensor module 410 may take images including the user 1010 while tracking the user 1010. A processor (e.g., processor 430 of FIG. 4) may analyze the images taken by the vision sensor module 410, and may identify the gesture of the user 1010. The processor 430 may identify that the gesture of the user 1010 is a behavior to control the electronic device 300 (e.g., user gesture to control a screen 1030 being displayed), and may control the electronic device 300. For example, the processor 430 may perform an operation on the screen 1030 based on the user's gesture.

Figure 12:
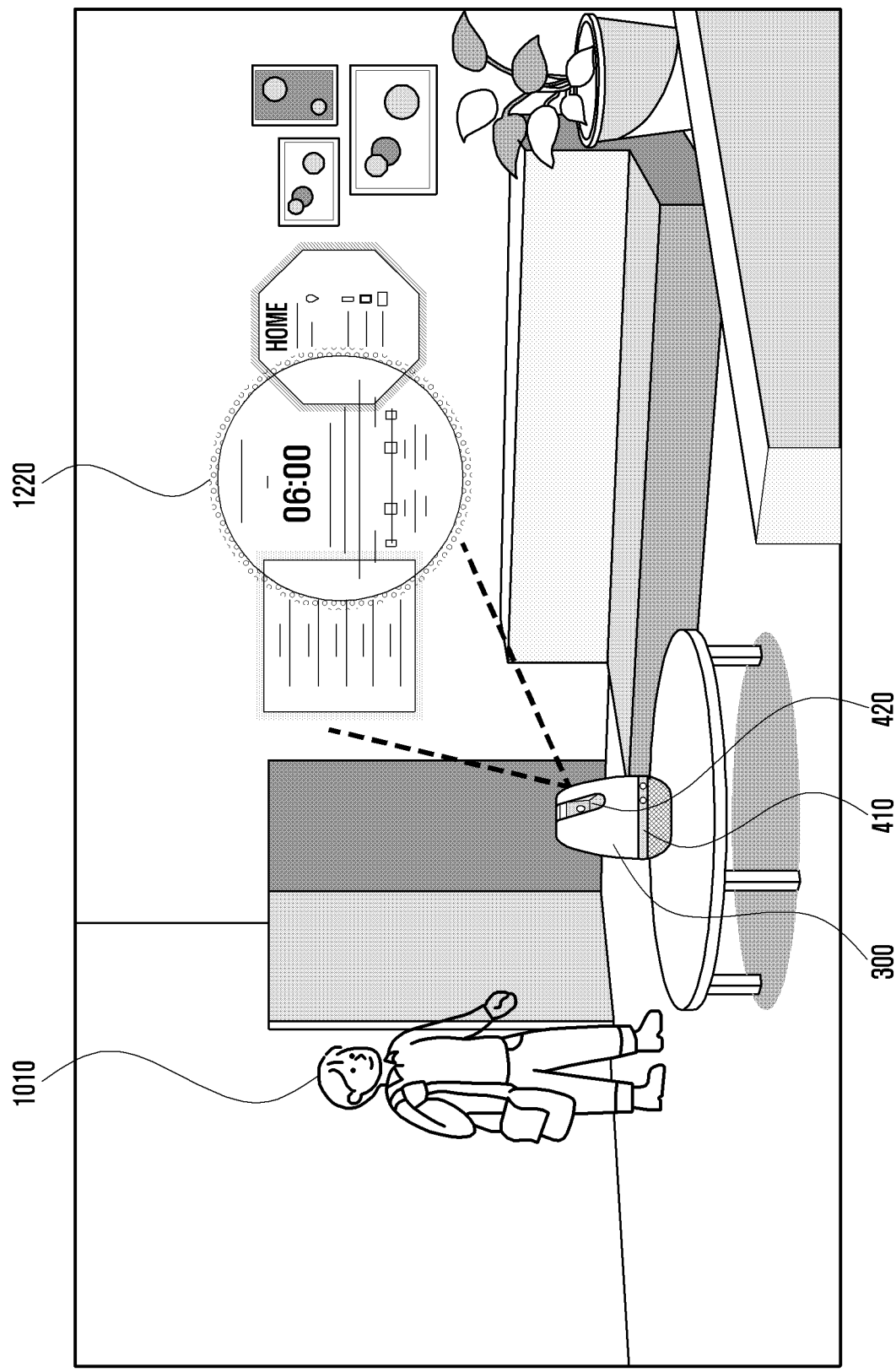
FIGS. 12 and 13 are diagrams illustrating an example in which an electronic device proposes content to be output onto a screen according to various embodiments.
Figure 13:
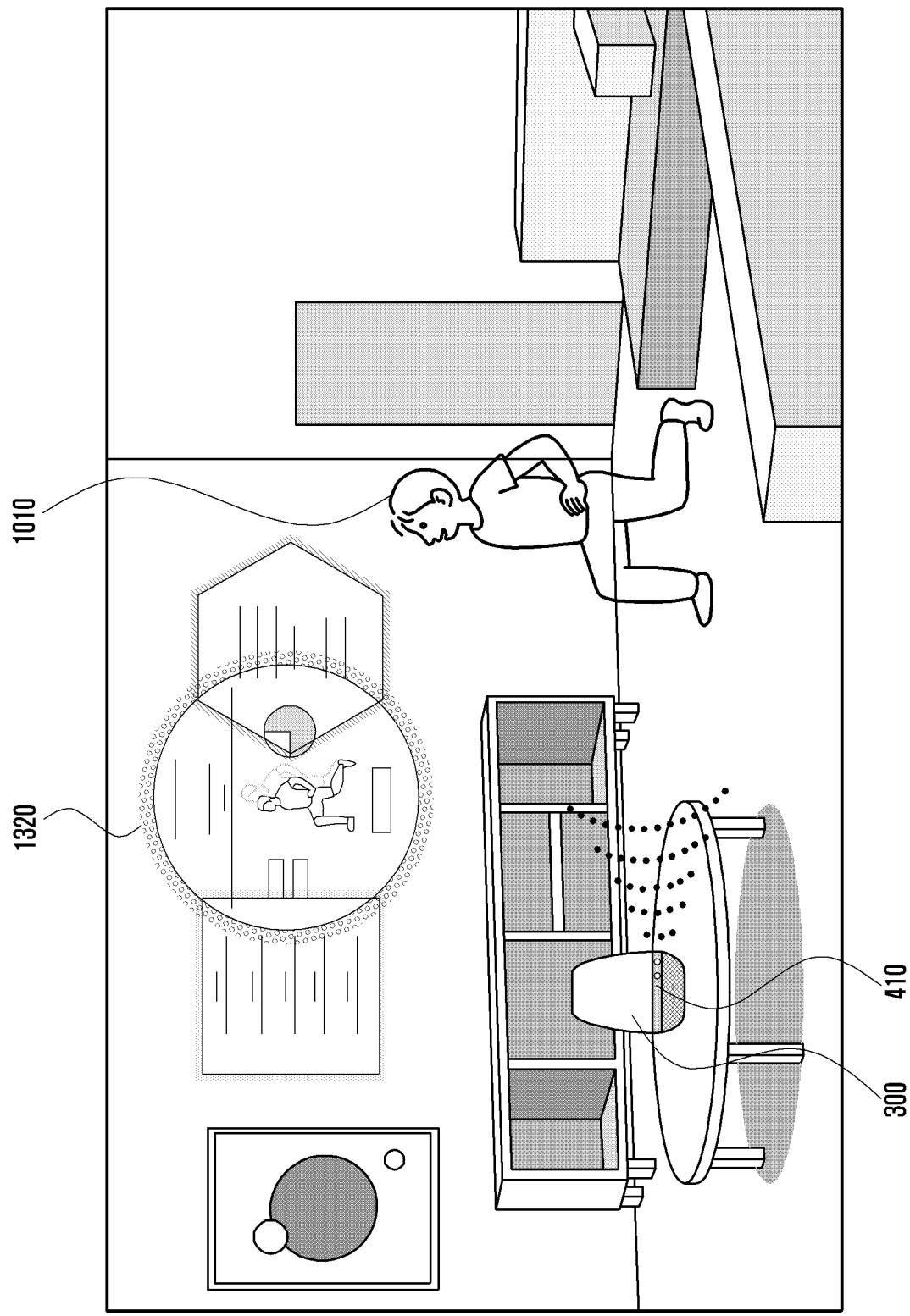

FIGS. 12 and 13 are diagrams illustrating an example in which an electronic device proposes content to be output onto a screen according to various embodiments.

Referring to FIGS. 12 and 13, an electronic device (e.g., electronic device 300 of FIG. 3) according to various embodiments of the disclosure may track a user 1010 every predetermined period using a vision sensor module (e.g., vision sensor module 410 of FIG. 4). The vision sensor module 410 may take images including the user 1010 while tracking the user 1010. A processor (e.g., processor 430 of FIG. 4) may analyze the images taken by the vision sensor module 410, and may identify context information on the behavior of the user 1010 (e.g., various kinds of information including an interaction between the user 1010 and an external object (e.g., door), time when the behavior of the user 1010 is detected, and type of the behavior of the user 1010). The processor 430 may generate a screen 1220 to be output based on the context information on the behavior of the user 1010, and may control the projector module 420 to output the generated screen 1220.

Referring to FIG. 12, the electronic device 300 may analyze the images taken using the vision sensor module 410, and may identify the context information (the user 1010 goes to work) on the behavior of the user 1010. The electronic device 300 may generate the screen 1220 to be output based on the context information on the behavior of the user. The generated screen may include information related to the behavior of the user. For example, various kinds of information including traffic information, weather, and schedule, being information related to the behavior of going to work, may be included in the screen 1220.

Referring to FIG. 13, the electronic device 300 may analyze the images taken using the vision sensor module 410, and may identify the context information (the user 1010 does exercise) on the behavior of the user 1010. The electronic device 300 may generate a screen 1320 to be output based on the context information on the behavior of the user. The generated screen may include information related to the behavior of the user. For example, various kinds of information including exercise start time, exercise running time, and information related to the exercise, being information related to the behavior of doing exercise, may be included in the screen 1320.

Figure 14A:
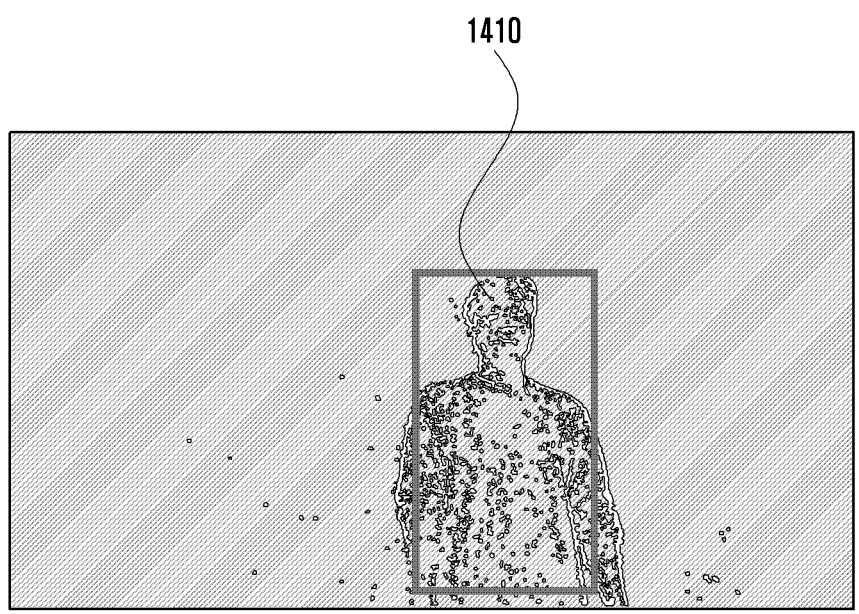
FIGS. 14A, 14B and 14C are diagrams illustrating an example in which an electronic device recognizes an external object using a vision sensor according to various embodiments.
Figure 14B:
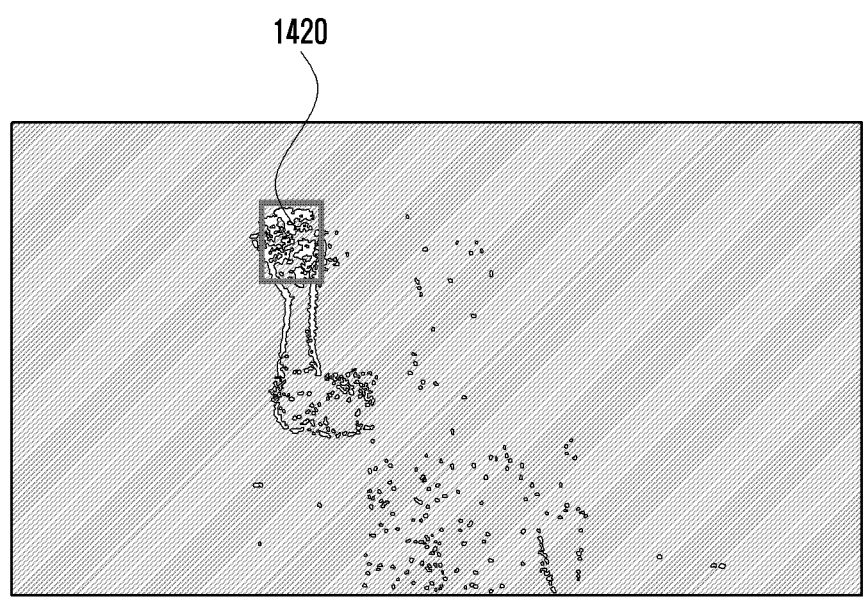
Figure 14C:
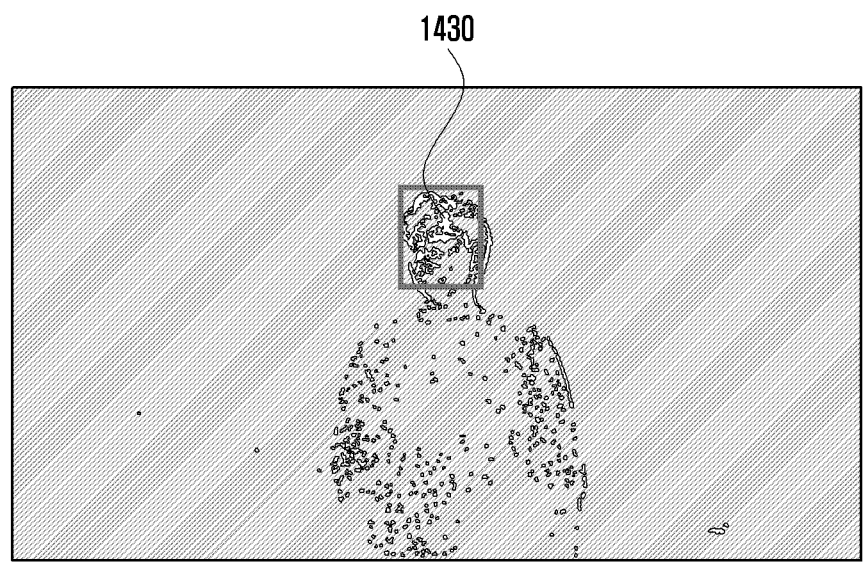

FIGS. 14A, 14B and 14C are diagrams illustrating an example in which an electronic device recognizes an external object using a vision sensor according to various embodiments.

An electronic device (e.g., electronic device 300 of FIG. 3) according to various embodiments of the disclosure may track an external object existing in a space in which the electronic device 300 is disposed using a vision sensor module (e.g., vision sensor module 410 of FIG. 4). The vision sensor module 410 may generate information related to movement of the external object through tracking of the external object. The information related to the movement of the external object may be whether the external object moves, the movement direction of the external object, or the movement distance of the external object. The vision sensor module 410 may be implemented as an event-based vision sensor to improve the tracking speed of the external object. The event-based vision sensor may refer, for example, to a sensor sensing an event related to the movement of the external object. For example, the event-based vision sensor does not transmit data to the processor 430 in case that the external object is in a standstill state, and in case that the external object moves, the event-based vision sensor may transmit information related to the movement to the processor 430. The event-based vision sensor may track the external object based on an amount of change of light from pixels corresponding to the external object being generated when the external object moves.

FIGS. 14A, 14B and 14C illustrate an image taken by the vision sensor module 410 implemented as the event-based vision sensor.

Referring to FIG. 14A, when movement of the external object 1410 occurs, it can be identified that the area 1410 corresponding to the external object in the image taken by the vision sensor module 410 is brighter than other areas.

Referring to FIG. 14B, when movement of the external object (e.g., user's hand) occurs, it can be identified that the area 1420 corresponding to the external object in the image taken by the vision sensor module 410 is brighter than other areas.

Referring to FIG. 14C, when movement of the external object (e.g., user's head) occurs, it can be identified that the area 1430 corresponding to the external object in the image taken by the vision sensor module 410 is brighter than other areas.

According to various embodiments of the disclosure, the electronic device 300 may track the movement of the external object based on the amount of change of light from pixels included in the taken image. The electronic device 300 may classify external objects included in the taken image while tracking the movement of the external object based on the amount of change of light. The classification of the external object may be performed by the electronic device 300 or an external server connected to the electronic device 300.

According to various embodiments of the disclosure, the electronic device 300 may process information requiring a fast processing speed and information requiring high accuracy, and may generate the information on the external object through synchronization of the processed information. The information requiring the fast processing speed may refer, for example, to information related to the tracking of the external object (e.g., movement direction of the external object). The information requiring the high accuracy may refer, for example, to information related to the classification of the external object (e.g., whether the external object is a user, whether the external object is the user's face or user's hand).

According to various embodiments of the disclosure, since the electronic device 300 independently performs the generation of the movement information of the external object and the classification of the external object, the electronic device 300 may determine whether to output the screen based on the result of the classification of the external object after first determining the position of the screen to be output based on the movement information of the external object. The method for independently performing the generation of the movement information of the external object and the classification of the external object may improve the processing speed as compared with the method for simultaneously performing the movement information and the classification. Since the classification of the external object being performed by the external server or to be performed by the electronic device is performed by identifying the amount of change of light, the speed of the classification may be lower than the speed of the movement information generation, and in case of simultaneously performing the movement information generation and the external object classification, the processing speed may be reduced due to the external object classification.

Figure 15:
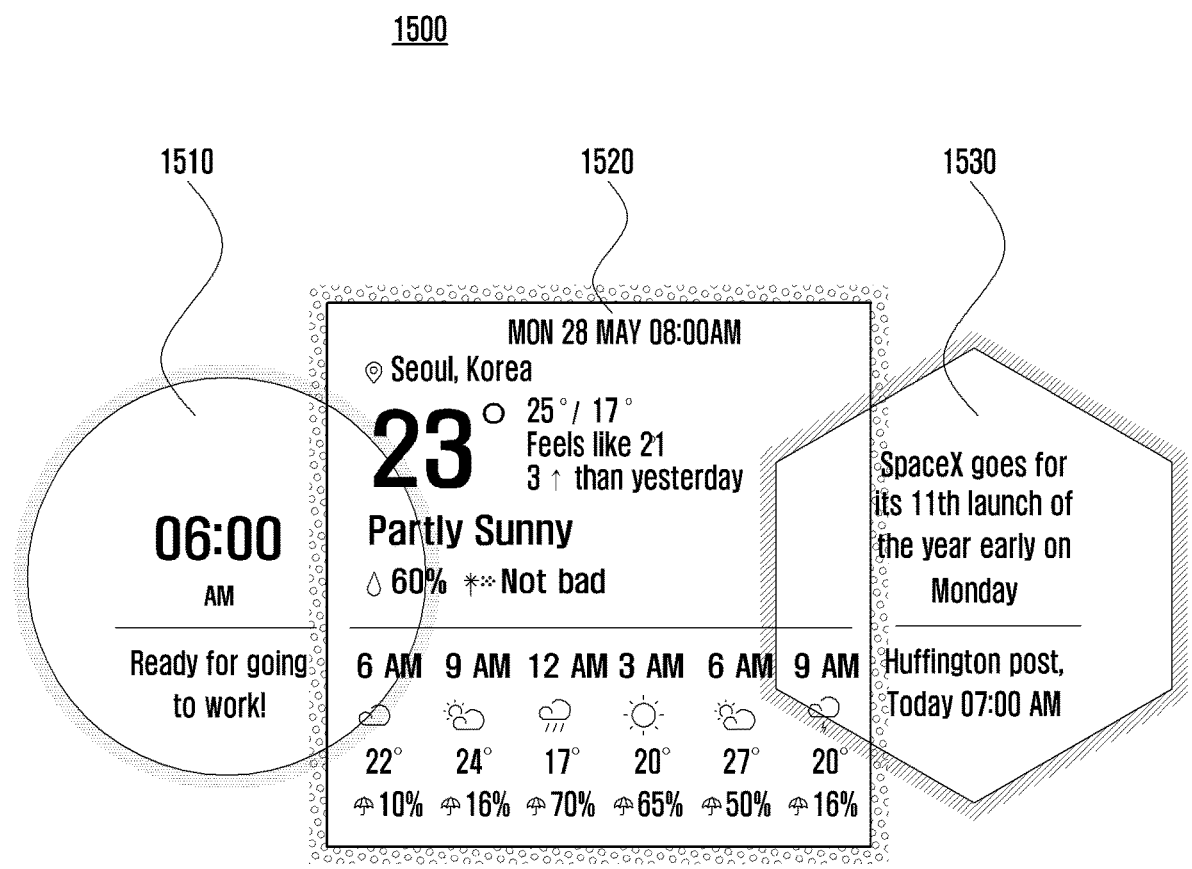
FIGS. 15, 16 and 17 are diagrams illustrating screens output by an electronic device according to various embodiments.
Figure 16:
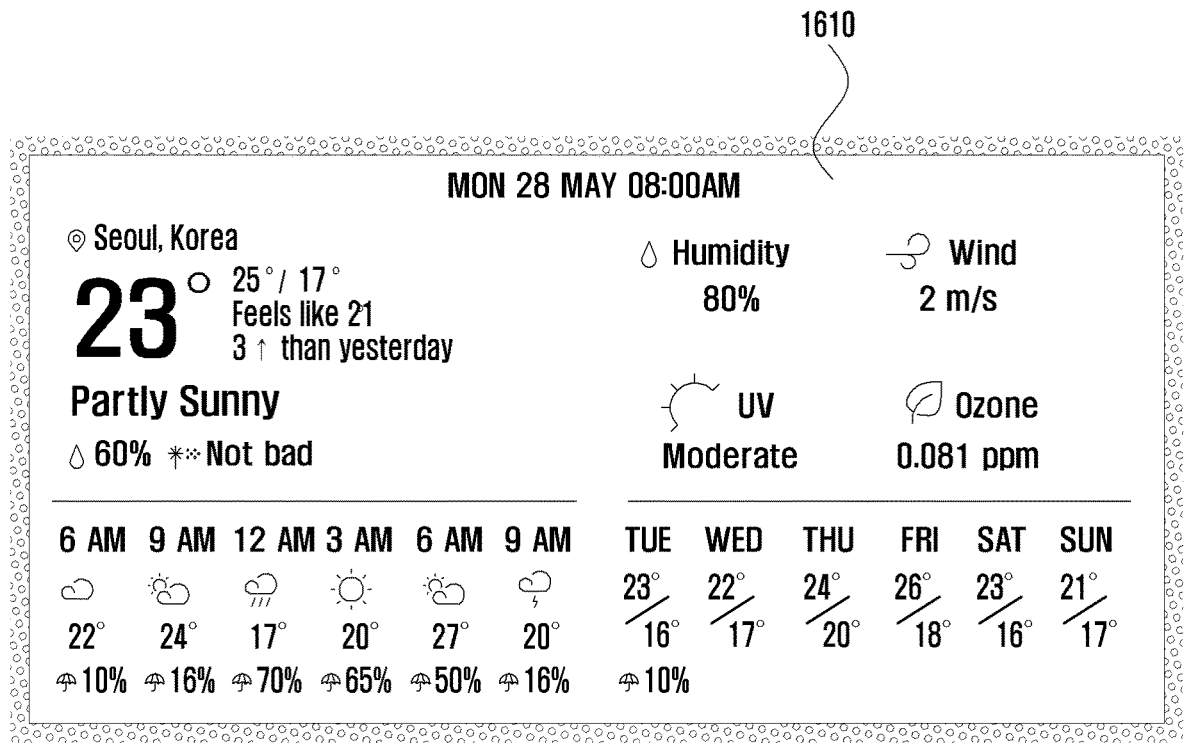
Figure 17:
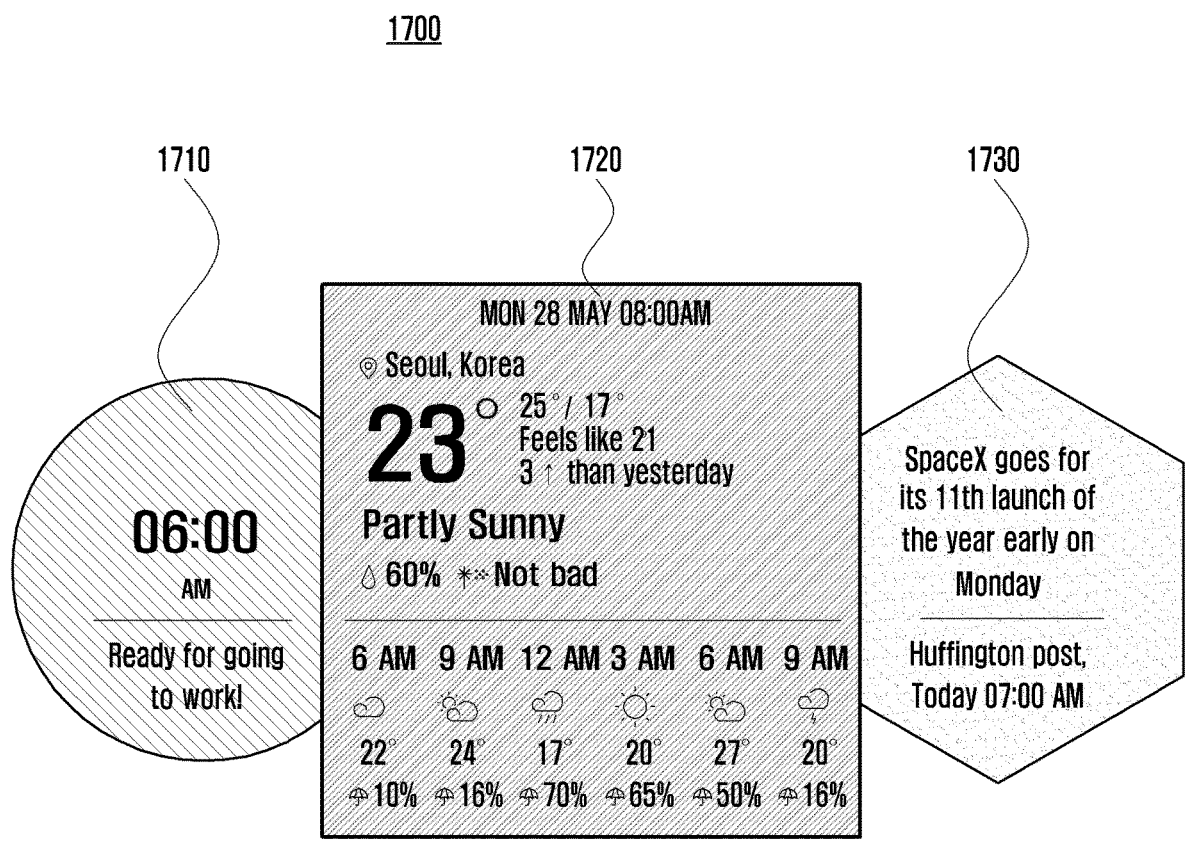

FIGS. 15, 16 and 17 are diagrams illustrating example screens output by an electronic device according to various embodiments.

FIG. 15 illustrates a screen 1500 that an electronic device (e.g., electronic device 300 of FIG. 3) according to various embodiments of the disclosure outputs using a projector module (e.g., projector module 420 of FIG. 4).

According to various embodiments of the disclosure, the output screen 1500 may include various types of content 1510, 1520, and 1530. The content 1510, 1520, and 1530 may include different kinds of information. The positions of the content 1510, 1520, and 1530 may be changed by a user's gesture. Although FIG. 15 illustrates weather content 1520 disposed in the center, alarm content 15120 or news content 1530 may be disposed in the center by the user's gesture.

According to various embodiments of the disclosure, outer areas of the content 1510, 1520, and 1530 may be implemented in black so that boundaries of the content 1510, 1520, and 1530 included in the screen 1500 being output become invisible.

According to various embodiments of the disclosure, the electronic device 300 may measure the distance between the external object and the electronic device 300 using the vision sensor module 410. The electronic device 300 may change the characteristic of the screen 1500 being output based on the measured distance. For example, the processor 430 may change the layout of the screen 1500 being output depending on the measured distance.

According to various embodiments of the disclosure, the electronic device 300 may output one of the content 1510, 1520, and 1530 on an enlarged screen 1600 that is switched over from the output screen 1500 depending on the measured distance.

FIG. 16 illustrates a screen 1600 that the electronic device 300 outputs using the projector module 420. The screen 1600 may include content 1610 obtained by enlarging the weather content 1520 included in the screen 1500 of FIG. 15. The electronic device 300 may switch over one 1520 of the content 1510, 1520, and 1530 included in the output screen 1500 onto a screen including the enlarged content 1610 in response to identifying that the distance between the electronic device 300 and the user becomes shorter than a predetermined distance.

According to various embodiments of the disclosure, the electronic device 300 may measure illumination of the space in which the electronic device 300 is disposed using an illuminance sensor (e.g., illuminance sensor included in the sensor module 176 of FIG. 1). The electronic device 300 may change the characteristic of the screen 1500 to be output based on the measured illumination. For example, if the measured illumination is lower than a predetermined value, the electronic device 300 may increase the contrast in order to increase the sharpness of the screen.

FIG. 17 illustrates a screen 1700 that the electronic device 300 outputs using the projector module 420. The screen 1700 may be a screen on which the content 1510, 1520, and 1530 included in the screen 1500 of FIG. 15 have increased contrast. A user can view a clear screen even in a dark space through the screen on which the contrast is increased.

An electronic device according to various example embodiments of the disclosure may include: a rotatable vision sensor configured to detect an external object in a space in which the electronic device is disposed=; a rotatable projector configured to output a screen into the space in which the electronic device is disposed; a memory storing spatial information of the space in which the electronic device is disposed; and a processor, wherein the processor is configured to: control the vision sensor to track the external object while being rotated, determine a position of the screen to be output by the projector based on the spatial information and information of the external object generated based on the tracking of the external object, and control the projector to output the screen to the determined position.

In the electronic device according to various example embodiments of the disclosure, the processor may be configured to control the projector to change an output position of the screen based on a changed position of the external object in response to the vision sensor detecting movement of the external object.

In the electronic device according to various example embodiments of the disclosure, the processor may be configured to: control the electronic device to perform advance scanning of the space in which the electronic device is disposed, determine at least one area onto which the projector can output the screen based on the result of the scanning, and store information about the determined area in the memory.

In the electronic device according to various example embodiments of the disclosure, the processor may be configured to: select one of the at least one area based on a position of the external object, and control the projector to output the screen onto the selected area.

The electronic device according to various example embodiments of the disclosure may further include a microphone, wherein the processor is configured to: detect reception of sound through the microphone, identify a direction of the sound based on information transmitted by the microphone, and determine whether to process an operation corresponding to the sound based on a position of the external object and the direction of the sound.

In the electronic device according to various example embodiments of the disclosure, the processor may be configured to determine to process the operation corresponding to the sound in response to identifying that the position of the external object and the direction of the sound coincide with each other.

In the electronic device according to various example embodiments of the disclosure, the processor may be configured to disregard the received sound in response to identifying that the position of the external object and the direction of the sound do not coincide with each other.

In the electronic device according to various example embodiments of the disclosure, the processor may be configured to perform pre-distortion for the screen based on information about an area onto which the screen is to be output.

In the electronic device according to various example embodiments of the disclosure, the processor may be configured to: control the electronic device to measure illumination of the space in which the electronic device is disposed using an illuminance sensor, and change a characteristic of the screen being output based on the measured illumination and a distance between the electronic device and the external object, being measured by the vision sensor. In the electronic device according to various example embodiments of the disclosure, the characteristic of the screen may include brightness of the screen or a layout of the screen.

In the electronic device according to various example embodiments of the disclosure, the vision sensor may include an event-based vision sensor configured to not transmit data based on the external object being in a standstill state and to transmit the data based on the external object being in a moving state, and the processor may be configured to control the vision sensor to track the external object based on an amount of change of light being generated based on the movement of the external object.

Figure 18:
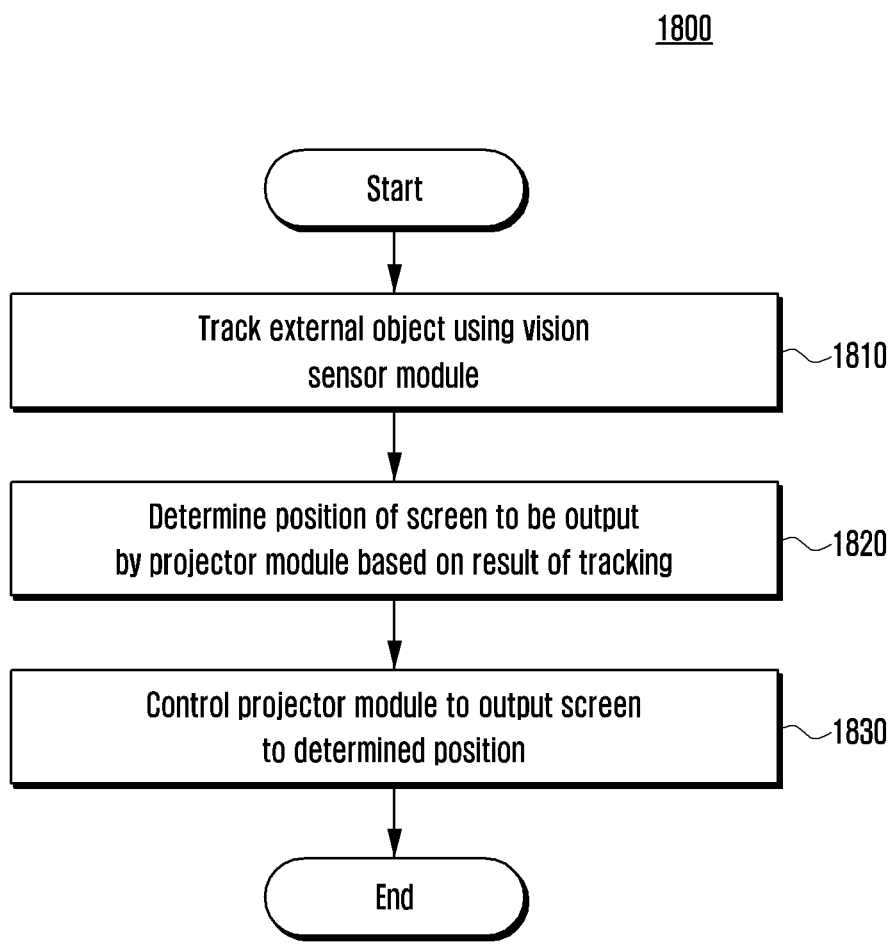
FIG. 18 is a flowchart illustrating an example method for operating an electronic device according to various embodiments.

FIG. 18 is a flowchart illustrating an example method for operating an electronic device (1800) according to various embodiments.

According to various embodiments of the disclosure, at operation 1810, an electronic device (e.g., electronic device 300 of FIG. 3) may track an external object using a vision sensor module (e.g., vision sensor module 410 of FIG. 4). According to various embodiments of the disclosure, the vision sensor module 410 may track the external object existing in the space in which the electronic device 300 is disposed. The vision sensor module 410 may generate information related to movement of the external object through tracking of the external object. The information related to the movement of the external object may be whether the external object moves, a movement direction of the external object, or a movement distance of the external object. The vision sensor module 410 may be implemented as an event-based vision sensor to improve the tracking speed of the external object. The event-based vision sensor may refer, for example, to a sensor sensing an event related to the movement of the external object. For example, the event-based vision sensor does not transmit data to the processor 430 in case that the external object is in a standstill state, and in case that the external object moves, the event-based vision sensor may transmit information related to the movement to the processor 430. The event-based vision sensor may track the external object based on an amount of change of light from pixels corresponding to the external object being generated when the external object moves. Accordingly, in case that the vision sensor module 410 is the event-based vision sensor, it can transmit the information related to the movement to the processor 430 only when the external object moves, and thus the tracking speed of the external object can be improved.

According to various embodiments of the disclosure, at operation 1820, the electronic device 300 may determine the position of the screen to be output by the projector module (e.g., projector module 420 of FIG. 4) based on the tracking result of the external object.

According to various embodiments of the disclosure, the electronic device 300 may determine the position of the screen to be output by the projector module 420 based on information of the external object generated based on the tracking result of the external object and spatial information.

According to various embodiments of the disclosure, the electronic device 300 may determine the position of the screen to be output by the projector module 420 through selection of one of positions of at least one screen stored in the memory 440. For example, the electronic device 300 may determine the position of the screen to be output by the projector module 420 through selection of the position corresponding to a direction that is different from the direction in which the external object exists.

According to various embodiments of the disclosure, at operation 1830, the electronic device 300 may control the projector module 420 to output the screen to the determined position.

According to various embodiments of the disclosure, the projector module 420 may output the screen based on the control of the processor 430. The projector module 420 may output the screen in a manner of projecting light onto a partial area of the space in which the electronic device 300 is disposed. For this, the projector module 420 may include a light source outputting light for outputting the screen, and at least one lens projecting the light in a specific direction. The processor 430 may control a first actuator (not illustrated) included in the projector module 420 to output the screen in the specific direction. The first actuator may rotate the lens included in the projector module 420 in a vertical direction or in a horizontal direction so as to output the screen in the specific direction based on the control of the processor 430.

A method for operating an electronic device according to various example embodiments of the disclosure may include: detecting an external object in a space in which the electronic device is disposed, and tracking, by a rotatable vision sensor, the external object while being rotated; determining, by a processor, a position of a screen to be output by a projector outputting the screen to the space in which the electronic device is disposed based on information of the external object generated based on the result of the tracking of the external object, and spatial information of the space in which the electronic device is disposed; and controlling the projector to output the screen to the determined position.

The method for operating an electronic device according to various example embodiments of the disclosure may further include controlling, by the processor, the projector to change an output position of the screen based on a changed position of the external object in response to the vision sensor detecting movement of the external object.

The method for operating an electronic device according to various example embodiments of the disclosure may further include: performing advance scanning of the space in which the electronic device is disposed; determining, by the projector, at least one area onto which the projector can output the screen based on the result of the scanning; and storing information about the determined area in the memory.

The method for operating an electronic device according to various example embodiments of the disclosure may further include: selecting one of the at least one area based on a position of the external object; and controlling the projector to output the screen onto the selected area.

The method for operating an electronic device according to various example embodiments of the disclosure may further include: detecting reception of sound through a microphone; identifying a direction of the sound based on information transmitted by the microphone; and determining whether to process an operation corresponding to the sound based on a position of the external object and the direction of the sound.

In the method for operating an electronic device according to various example embodiments of the disclosure, determining whether to process the operation corresponding to the sound may include: determining to process the operation corresponding to the sound in response to identifying that the position of the external object and the direction of the sound coincide with each other; and disregarding the received sound in response to identifying that the position of the external object and the direction of the sound do not coincide with each other.

The method for operating an electronic device according to various example embodiments of the disclosure may further include performing pre-distortion for the screen based on information about an area onto which the screen is to be output.

The method for operating an electronic device according to various example embodiments of the disclosure may further include: measuring illumination of the space in which the electronic device is disposed using an illuminance sensor; and changing a characteristic of the screen being output based on the measured illumination and a distance between the electronic device and the external object, being measured by the vision sensor.

In the method for operating an electronic device according to various example embodiments of the disclosure, the vision sensor may include an event-based vision sensor configured to not transmit data based on the external object being in a standstill state and to transmit the data based on the external object being in a moving state, and tracking, by the vision sensor, the external object may include tracking the external object based on an amount of change of light being generated in accordance with the movement of the external object.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added. While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

The invention claimed is:

1. An electronic device comprising:
   a rotatable vision sensor configured to detect an external object in a space in which the electronic device is disposed;
   a rotatable projector configured to output a screen into the space in which the electronic device is disposed;
   memory storing spatial information of the space in which the electronic device is disposed; and
   a processor,
   wherein the processor is configured to:
      control the vision sensor to track the external object while being rotated,
      classify the external object using an image obtained by the vision sensor while generating movement information of the external object based on tracking of the external object, wherein the generating movement information is complete before the classification of the external object is complete,
      determine, before the classification of the external object is complete, a position of the screen to be output by the projector based on the spatial information and the movement information of the external object generated based on the tracking of the external object while classifying the external object,
      determine, after the position of the screen is determined and the classification of the external object is complete, whether to output the screen on the determined position based on a result of the classification of the external object, and
      according to determination to output the screen on the determined position, control the projector to output the screen to the determined position;
   wherein the external object is a user and the classification of the external object is identification of the user.

2. The electronic device of claim 1, wherein the processor is configured to control the projector to change an output position of the screen based on a changed position of the external object in response to the vision sensor detecting movement of the external object.

3. The electronic device of claim 1, wherein the processor is configured to:
   perform advance scanning of the space in which the electronic device is disposed, determine at least one area onto which the projector can output the screen based on the result of the scanning, and store information about the determined area in the memory.

4. The electronic device of claim 3, wherein the processor is configured to:

select one of the at least one area based on a position of the external object, and control the projector to output the screen onto the selected area.

5. The electronic device of claim 1, further comprising a microphone, wherein the processor is configured to:

detect reception of sound through the microphone, identify a direction of the sound based on information transmitted by the microphone, and determine whether to process an operation corresponding to the sound based on a position of the external object and the direction of the sound.

6. The electronic device of claim 5, wherein the processor is configured to determine to process the operation corresponding to the sound in response to identifying that the position of the external object and the direction of the sound coincide with each other.

7. The electronic device of claim 5, wherein the processor is configured to disregard the received sound in response to identifying that the position of the external object and the direction of the sound do not coincide with each other.

8. The electronic device of claim 1, wherein the processor is configured to perform pre-distortion for the screen based on information about an area onto which the screen is to be output.

9. The electronic device of claim 1, wherein the processor is configured to:

measure illumination of the space in which the electronic device is disposed using an illuminance sensor, and change a characteristic of the screen being output based on the measured illumination and a distance between the electronic device and the external object, the distance being measured by the vision sensor.

10. The electronic device of claim 9, wherein the characteristic of the screen comprises brightness of the screen or a layout of the screen.

11. The electronic device of claim 1, wherein the vision sensor comprises an event-based vision sensor configured to not transmit data based on the external object being in a standstill state and to transmit the data based on the external object being in a moving state, and the processor is configured to control the vision sensor to track the external object based on an amount of change of light being generated in accordance with the movement of the external object.

12. A method for operating an electronic device comprising:

detecting an external object in a space in which the electronic device is disposed, and tracking, by a rotatable vision sensor, the external object while being rotated;

classifying the external object using image obtained by the vision sensor while generating movement information of the external object based on tracking of the external object, wherein the generating movement information is complete before the classification of the external object is complete, determining, by a processor, before the classification of the external object is complete, a position of a screen to be output by a projector, based on the movement information of the external object generated based on the tracking of the external object, and spatial information of the space in which the electronic device is disposed while classifying the external object;

determining, after the position of the screen is determined and the classification of the external object is complete, whether to output the screen on the determined position based on a result of the classification of the external object; and according to determination to output the screen on the determined position, controlling the projector to output the screen to the determined position;

wherein the external object is a user and the classification of the external object is identification of the user.

13. The method of claim 12, further comprising controlling, by the processor, the projector to change an output position of the screen based on a changed position of the external object in response to the vision sensor detecting movement of the external object.

14. The method of claim 12, further comprising:

performing advance scanning of the space in which the electronic device is disposed;

determining, by the projector, at least one area onto which the projector can output the screen based on the result of the scanning; and storing information about the determined area in the memory.

15. The method of claim 14, further comprising:

selecting one of the at least one area based on a position of the external object; and controlling the projector to output the screen onto the selected area.

* * * * *